US012147148B2

(12) United States Patent
Schroeder

(10) Patent No.: US 12,147,148 B2
(45) Date of Patent: Nov. 19, 2024

(54) MEANS AND PROCESS FOR CREATING WORKS HAVING THE CHARACTERISTIC LOOK AND FEEL OF FILMS GENERATED VIA THE TECHNICOLOR® PROCESS

(71) Applicant: Andrew Schroeder, Port Jefferson, NY (US)

(72) Inventor: Andrew Schroeder, Port Jefferson, NY (US)

(*) Notice: Subject to any disclaimer, the term of this patent is extended or adjusted under 35 U.S.C. 154(b) by 0 days.

(21) Appl. No.: 16/514,421

(22) Filed: Jul. 17, 2019

(65) Prior Publication Data

US 2020/0026158 A1    Jan. 23, 2020

Related U.S. Application Data

(60) Provisional application No. 62/699,061, filed on Jul. 17, 2018.

(51) Int. Cl.
*H04N 23/56* (2023.01)
*G01J 3/02* (2006.01)
(Continued)

(52) U.S. Cl.
CPC ............ *G03B 17/14* (2013.01); *G01J 3/0232* (2013.01); *G01J 3/2823* (2013.01); *H04N 23/56* (2023.01); *G01J 2003/2826* (2013.01)

(58) Field of Classification Search
None
See application file for complete search history.

(56) References Cited

U.S. PATENT DOCUMENTS

| 4,355,888 A * | 10/1982 | Pearson | ............ G03F 3/04 347/232 |
| 8,014,666 B2 * | 9/2011 | Neiman | ............ G03B 17/00 396/533 |

(Continued)

FOREIGN PATENT DOCUMENTS

WO    WO-2015153213 A1 *  10/2015  ............ G03B 11/00

*Primary Examiner* — Cynthia Segura
(74) *Attorney, Agent, or Firm* — Intellectulaw The Law Offices of P.B. Tufariello, Esq

(57) ABSTRACT

An apparatus for the creation of works having the same creative look and feel as works filmed via the original Technicolor® three-strip filming process comprising: a camera, a lens mounted on said camera, a step-up, lens-filter adapter ring mounted on said lens of said camera, a diffusion filter mounted on said step-up, lens-filter adapter ring, said diffusion filter capable of mimicking the effect of traditional silver nitrate film used in the Technicolor® process, and an optical band-stop filter mounted on said the diffusion filter, said optical band-stop filter capable of preventing the transmission of light having a 570-600 nm wavelength and permitting no more than 20% light from being transmitted through it.

A wide angle dispersing light fixture comprising a clear bowl-shaped outer housing having an inner surface, and an outer surface mirrorized with RUSTOLEUM® MIRROR EFFECT, silver, SKU NO. 26772, and a candelabra style fixture capable of receiving a multiplicity of light bulbs, said light bulbs being Hypericon® A21 LED BULBS having an extended CRI of 94 or higher, and capable of providing R-9 and an unbroken spectrum of light capable of working in daylight balance between 4800 and 5600 kelvin.

A chromatic exposure meter comprising an eyecup and a spectroscope having multiple glass-prisms, a nanometer scale and a control that can open and close the iris/slit to change the amount of light that enters the spectroscope, said (Continued)

spectroscope further uprising an ISO Wheel having a scale for 12, 25, 50, 100, 200, 400, 800, 1600, 3200, and 6400, a free-moving Shutter Speed Wheel equipped with a Shutter Speed scale of 1/800, 1/400, 1/200, 1/100, 1/50, 1/25, 1/12, 1/6, 1/3, and 1/1.6 of a second, a free moving F-Stop Wheel equipped with an f-stop scale of 1.4, 2, 2.8, 4, 5.6, 8, 11, 16, 22, and 32 and a Rainbow Calibrator scale, and a fixed Foot Candle Wheel correlating to the Iris-loot Candle Measure, and equipped with a scale of 3, 6, 12, 25, 50, 100, 200, 400, 800, 1600, 3200, and 6400-foot candles.

28 Claims, 29 Drawing Sheets

(51) Int. Cl.
*G01J 3/28* (2006.01)
*G03B 17/14* (2021.01)

(56) References Cited

U.S. PATENT DOCUMENTS

| | | | |
|---|---|---|---|
| 2003/0173525 A1* | 9/2003 | Seville | G01N 21/6447 250/458.1 |
| 2007/0195420 A1* | 8/2007 | Fitchmun | G02C 7/104 359/603 |
| 2009/0042179 A1* | 2/2009 | Peltie | A61B 1/00186 382/120 |
| 2010/0225783 A1* | 9/2010 | Wagner | H04N 5/2356 348/229.1 |
| 2013/0062637 A1* | 3/2013 | Reed | H01L 33/50 257/89 |
| 2015/0268396 A1* | 9/2015 | Weber | G02C 7/104 359/359 |
| 2018/0203171 A1* | 7/2018 | McPherson | G02C 7/104 |
| 2022/0230323 A1* | 7/2022 | Liba | G06T 5/008 |

* cited by examiner

MEANS AND PROCESS FOR CREATING WORKS HAVING THE CHARACTERISTIC LOOK AND FEEL OF FILMS GENERATED VIA THE TECHNICOLOR® PROCESS

CROSS-REFERENCE TO RELATED APPLICATION

This application claims priority from U.S. Provisional Application Ser. No. 62/699,061 filed on Jul. 17, 2018, and incorporated by reference in its entirety, as if more fully set forth herein.

BACKGROUND OF THE INVENTION

Field of Invention

The present invention relates to a combination of filters, and process for their use to replicate the effect of the original three-strip process of Technicolor® film, using any camera, still or cinema, digital or film. More particularly, the present invention relates to a combination of a diffuser type filter and a novel band-stop filter together with a process for their use with any camera to produce works exhibiting colors and having an overall look and feel reminiscent of the overall look and feel of classic films created using the three-strip filming Technicolor® process.

Prior Art

The film-making era from the 1920s to the 1960s is commonly known as the Golden Age of Hollywood. This time period, known for its numerous iconic and classical films, first began with the addition of sound to films, and later color.

One of the hallmarks of this era was the three-strip Technicolor® process. Color cinematography, and especially Technicolor®'s three-strip process changed the course of the film industry dramatically.

Prior to the introduction of Technicolor, Inc.'s Three-Color Photography (U.S. Pat. No. 2,000,058), photography systems, filming, and editing processes could not capture the full visible light spectrum, leaving resulting films with strange color palettes, lacking blues, purples, and yellows. Following its introduction, however, the appearance of films created with Three-Color Photography changed dramatically, leading to a high demand in the industry and from consumers around the world for the vibrant, sharp, saturated, high contrast of colors achieved by the three-strip process.

The process involved a Technicolor® camera which was supplied with three reels of black and white, negative film stock. The light taken into the camera was split by a prism into two equal parts. The first part of the beam was directed to the back of the camera, wherein a recording was made through a green filter on one of the three film reels. The second part of the beam was directed at a 90-degree angle toward the remaining two film strips behind a magenta filter which would allow for the blue and red light to pass through and be recorded.

As a result, three film strips of black and white film with slightly different exposures of the same images were generated based on the green, blue, and red light present within the scene. These film strips were then modified by a dyeing process. The red strips were dyed cyan, the green strips were dyed magenta, and the blue strips were dyed yellow. Then, the three strips ere pressed onto a single film stock and the color as implanted into the final film positive.

The process was successful but was not without faults. Technicolor®'s three-strip process was such high demand that it could not satisfy it; having only enough trained employees to produce a few films a year. The process itself was expensive not only because it required 3 times the amount of negative film to generate its effect, but also because of the intense dying process necessary for each reel of negative film. The process was time-consuming to complete; all the coloring had to be completed and then the films had to be combined into one. Further, in order to have the desired final effect, the sets, costumes, makeup and other colorful elements had to be carefully chosen, driving the cost and time required in the production. In addition, the noise generated by the specially designed cameras had to somehow be reduced if not eliminated. The three film reels being recorded at the same time created such a significant amount of noise that the cameras themselves had to be insulated. Finally, the excessive amount of light required in the filming of the scenes made the whole filming process downright unbearable. Because of the beam splitting and recording of 3 negatives, a massive amount of light was necessary in the production of three-strip Technicolor® films. This was a critical factor because of the use of incandescent, halogen bulbs. The cost of electricity to turn on the lights drove up the price of filming. But more notably, the heat given off by the lights could push the temperature of the sets up to and beyond 100 degrees Fahrenheit, making the filming of Technicolor® movies downright unbearable.

The expensive, low availability, time-consuming, and brutal temperature nature of this process lead to the phasing out of the three-strip portion of the process in 1955 and then discontinuing the use of the dye transfer process in 1972.

Today, nearly all mainstream cinema is shot with digital cameras. However, none of them are able to precisely and accurately replicate the effect of Technicolor®'s original three-strip process, which is not forgotten. Many filmmakers have sought to replicate the effect of the process through digital computer editing, but this has proven equally and extremely complicated and time-consuming with the ending effect failing to precisely match the Technicolor® results.

Digital cinema cameras are designed to work well in low light, thereby bringing down the cost of lighting and the heat it generates on sets. To work well in low light each photosite in the camera has a fairly weak color filter, letting in more wavelengths than it should to add to the overall volume of light collected by the sensor. The resulting picture contains many wavelengths that are captured by more than one color channel at once (i.e. both red and green end up seeing the same wavelength.) This impacts the color in a way, similar to when you mix too many different colors of paint together. The subtle secondary colors end up mixing into shades of brown, while the primaries never saturate past a certain intensity.

To combat this, camera designers use complicated mathematical algorithms to squash and stretch the color signal in the camera after it's been recorded, causing cameras to need extra hardware to do the processing and extra power to run the hardware. But in the end, they still can't do much to make up for the compromised sensor design. One cannot recreate color definition that one has not recorded initially. Nor can one un-mix and separate the colors that have melded into brown. While some still camera manufacturers like Phase One, are making cameras with less color channel overlap (at a price of 40 k or more per camera) thereby coming closer to achieving a Technicolor effect, there still is no single process and equipment that can be retrofitted to ANY camera, still or cinema, digital or film, to produce works exhibiting the traditional Technicolor® effect. Accordingly, there still exists a need for a means of replicating the Technicolor® three-strip process using modern cameras, effectively and inexpensively.

SUMMARY OF THE INVENTION

Accordingly, it is an object of the present invention to provide inventive means capable of being retrofitted on any currently available camera, and a process for use of said inventive means to replicate the effects of the original Technicolor® three-strip filming process.

It is a further object of the present invention to provide inventive means capable of being retrofitted on any currently available camera, and a process for use of said inventive means with said camera to create works having the same creative look and feel as works filmed via the original Technicolor® three-strip filming process.

It is still a further object of the present invention to provide inventive means capable of being retrofitted on any currently available camera, and a process for use of said inventive means with said camera, wherein said inventive means is capable of eliminating a range of wavelengths of yellow light, thereby enhancing the green, blue, and red colors in the work produced by the camera.

It is yet another object of the present invention to provide inventive means capable of being retrofitted on any currently available camera, and a process for use of said inventive means with said camera, wherein said inventive means is capable of replicating the effect of the original Technicolor® three-strip process to generate photo and video images with high contrast, supersaturated, vibrant colors.

It is still an even further object of the present invention to provide inventive means capable of being retrofitted on any currently available camera, and a process for use of said inventive means with said camera, wherein said inventive means comprises an inventive band stop filter capable of eliminating a range of yellow light wavelengths, thereby enhancing the green, blue, and red colors recorded by the camera to produce a work with high contrast, supersaturated, vibrant colors.

It is an even further object of the present invention to provide inventive means capable of being retrofitted on any currently available camera, and a process for use of said inventive means with said camera, wherein said inventive means comprises an inventive band stop filter capable of eliminating a range of yellow light wavelengths, an inventive lighting fixture, and an inventive light reflector which when used together with said camera are capable of producing works with high contrast, supersaturated, vibrant colors.

Finally, it is an object of the present invention to provide an inventive spectroscope capable of determining just how much blue, red, and green light the inventive-means-retrofitted camera will actually register.

In accordance with the present invention, there is provided means for producing works having the same creative look and feel as works filmed via the original Technicolor® three-strip filming process. Such means comprises a conventionally available camera having a lens, a lens-filter adapter attached to said lens of said conventionally available camera, a diffuser type filter attached to said lens-filter adapter, and an optical band-stop filter attached to said diffuser type filter. Said optical band-stop filter, when tested using a USH4000 Fiber Spectrophotometer, transmits no more than 20% of light generated by an LS-1 Series Tungsten Halogen Light Source, allowing blue, green and red light to register clearly and blocking yellow light in its totality.

These and other objects, advantages, features, and characteristics of the invention will be apparent from the following description of the preferred embodiments, considered along with the accompanying drawings.

BRIEF DESCRIPTION OF THE DRAWINGS

It is believed that the present invention will be better understood from the following detailed description taken in conjunction with the accompanying drawings, in which the numerals represent identical elements and wherein.

| LIST OF ELEMENTS AND THEIR RESPECTIVE IDENTIFYING NUMERALS | |
|---|---|
| NO. | ELEMENT |
| 10 | Means For Creating Works, Having The Characteristic Look And Feel Of Films Generated Via The Technicolor ® Process. |
| 20 | Camera and Lens |
| 30 | Step Up lens Ring Adapter |
| 40 | Diffusion Filter |
| 50 | Optical Band-Stop Filter |
| 60 | Chromatic Exposure meter |
| 62 | Scale |
| 64 | bracket |
| 66 | primaries |
| 68 | Mountable LED light |
| 70 | Bowl Fill light. |
| 72 | Concave Bowl like housing |
| 72A | Inner Surface of Concave Bowl Like Housing |
| 72B | Outer Surface of Concave Bowl Like Housing |
| 74 | Candelabra Type light fixture |
| 76 | LED Light Bulbs |

DETAILED DESCRIPTION OF TILE PREFERRED EMBODIMENT

Figure 1:
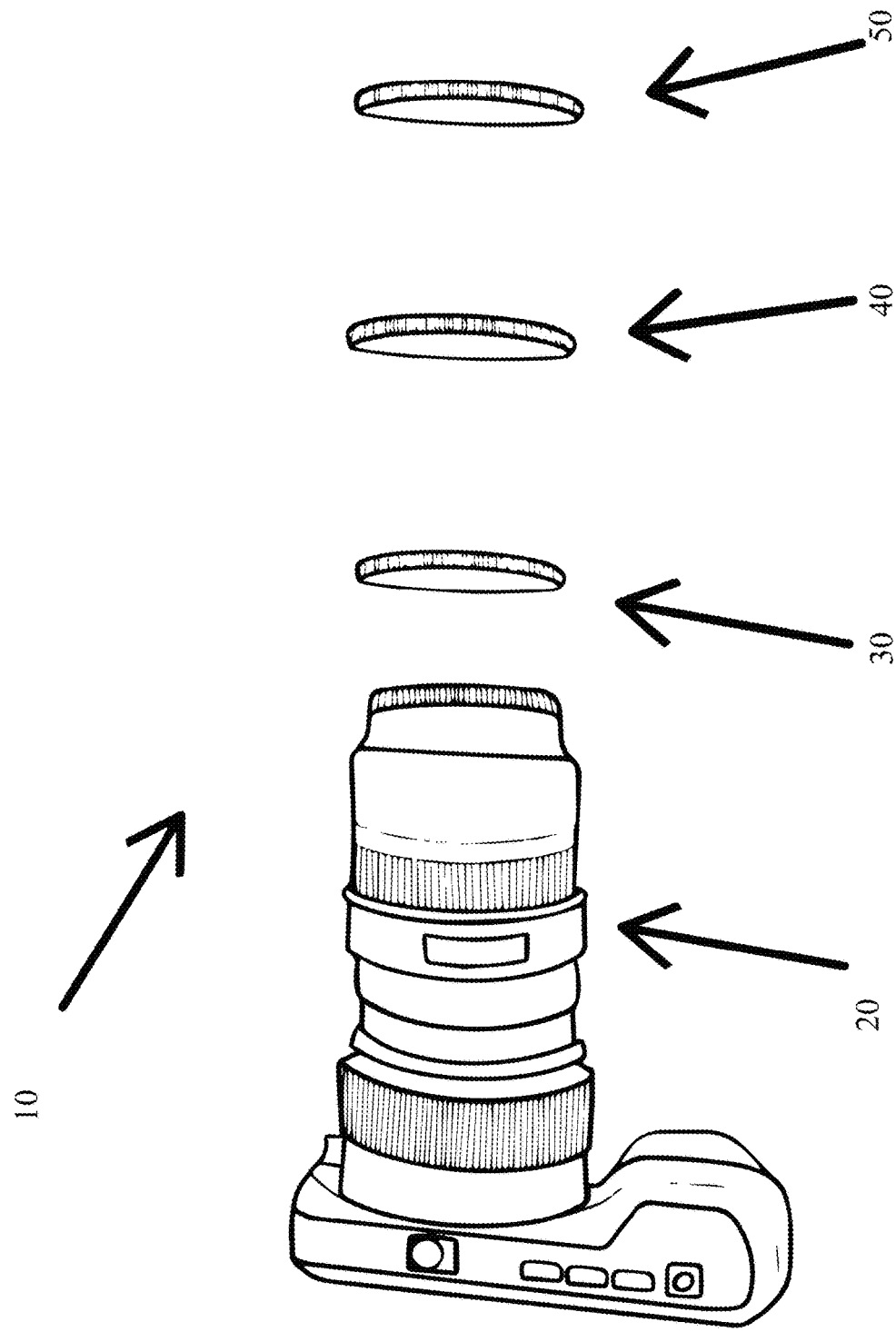
FIG. 1 is an exploded top plan view of a conventionally available camera and the inventive means.
Figure 2:
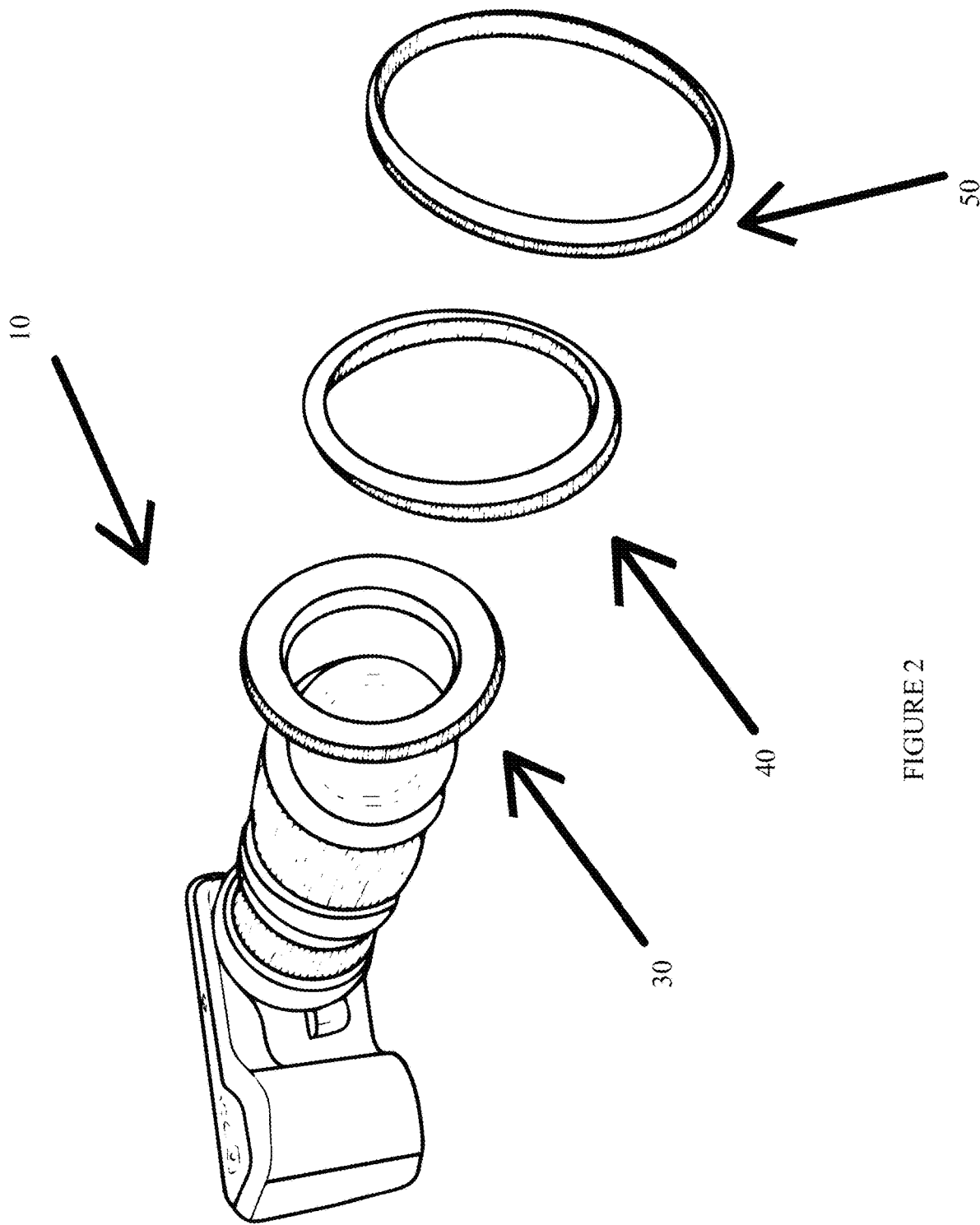
FIG. 2 is an exploded three-dimensional perspective view of a conventionally available camera and the inventive means.
Figure 3:
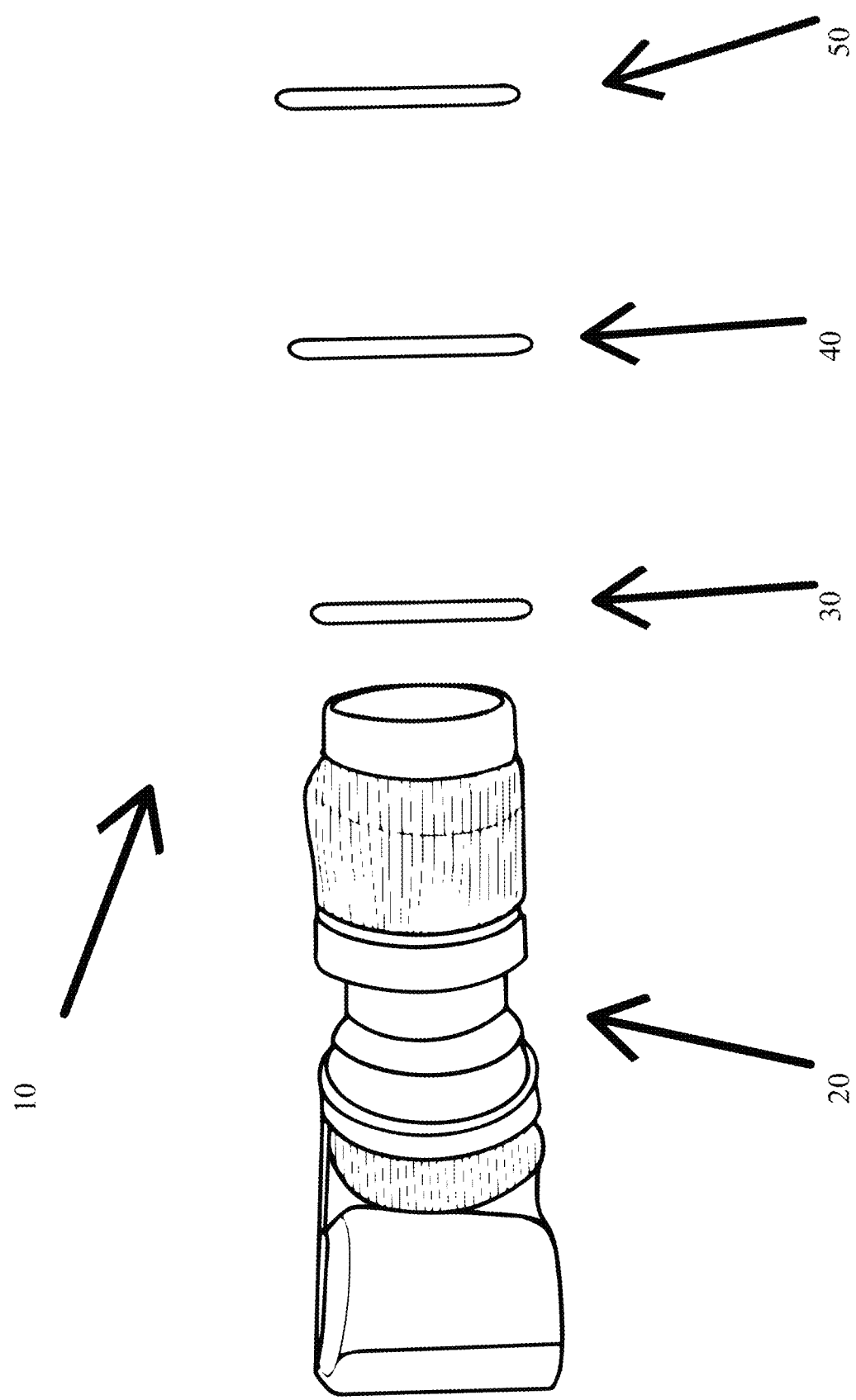
FIG. 3 is an exploded side plan view of a conventionally available camera and the inventive means.
Figure 4:
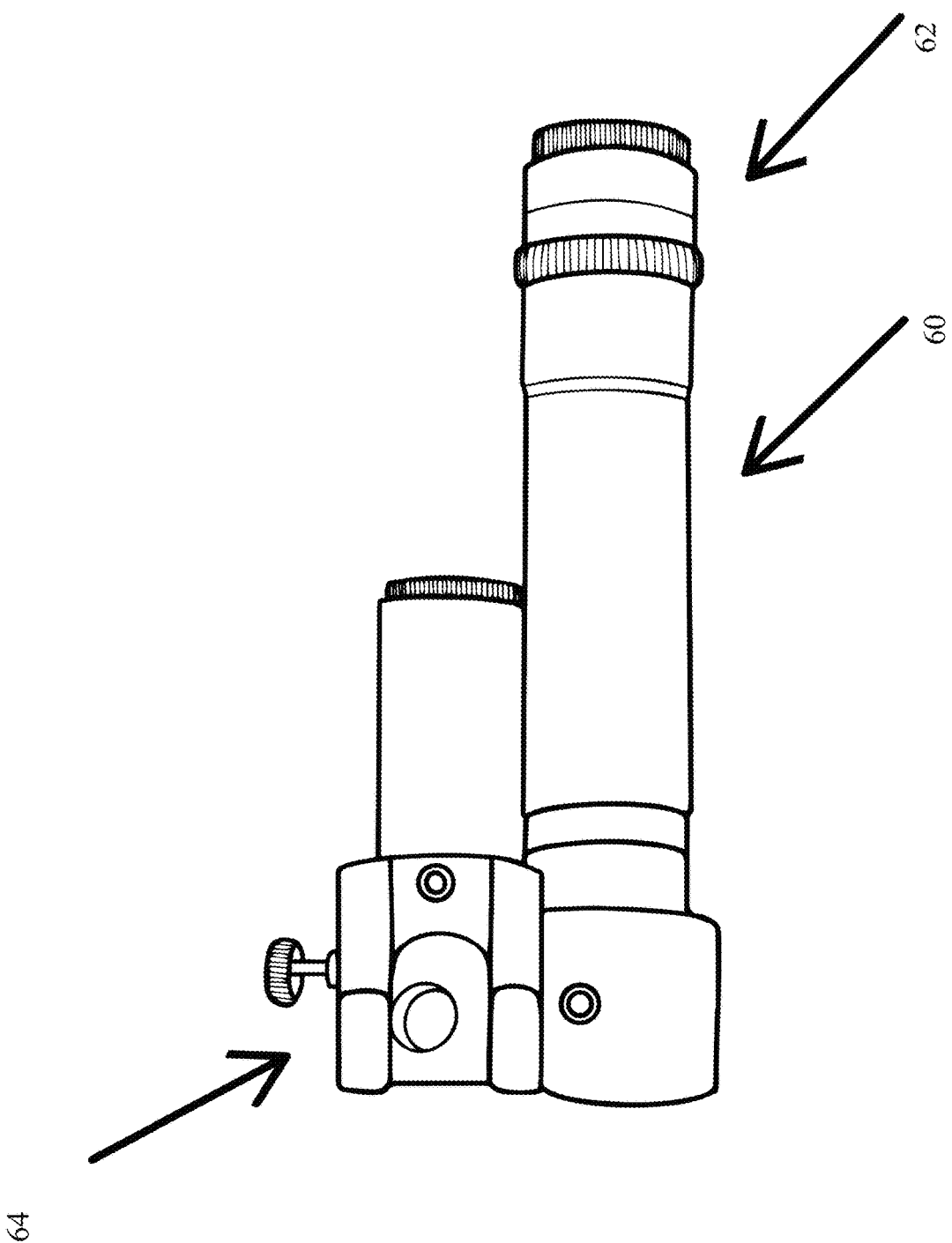
FIG. 4 is side plan view of an exposure meter for use with the inventive means and the conventionally available camera of FIGS. 1-3.
Figure 5:
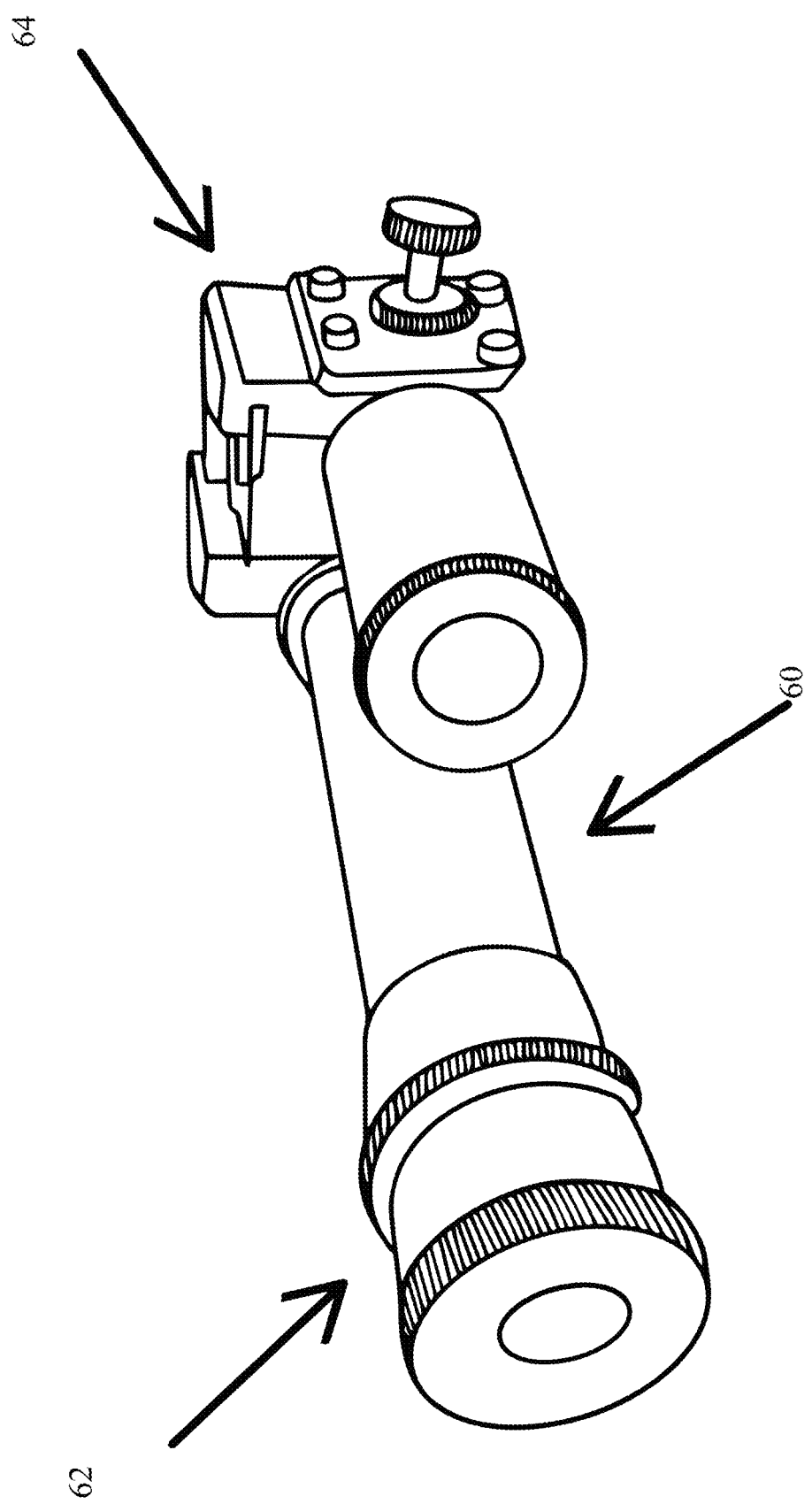
FIG. 5 is three-dimensional perspective view of the exposure meter of FIG. 4.
Figure 6:
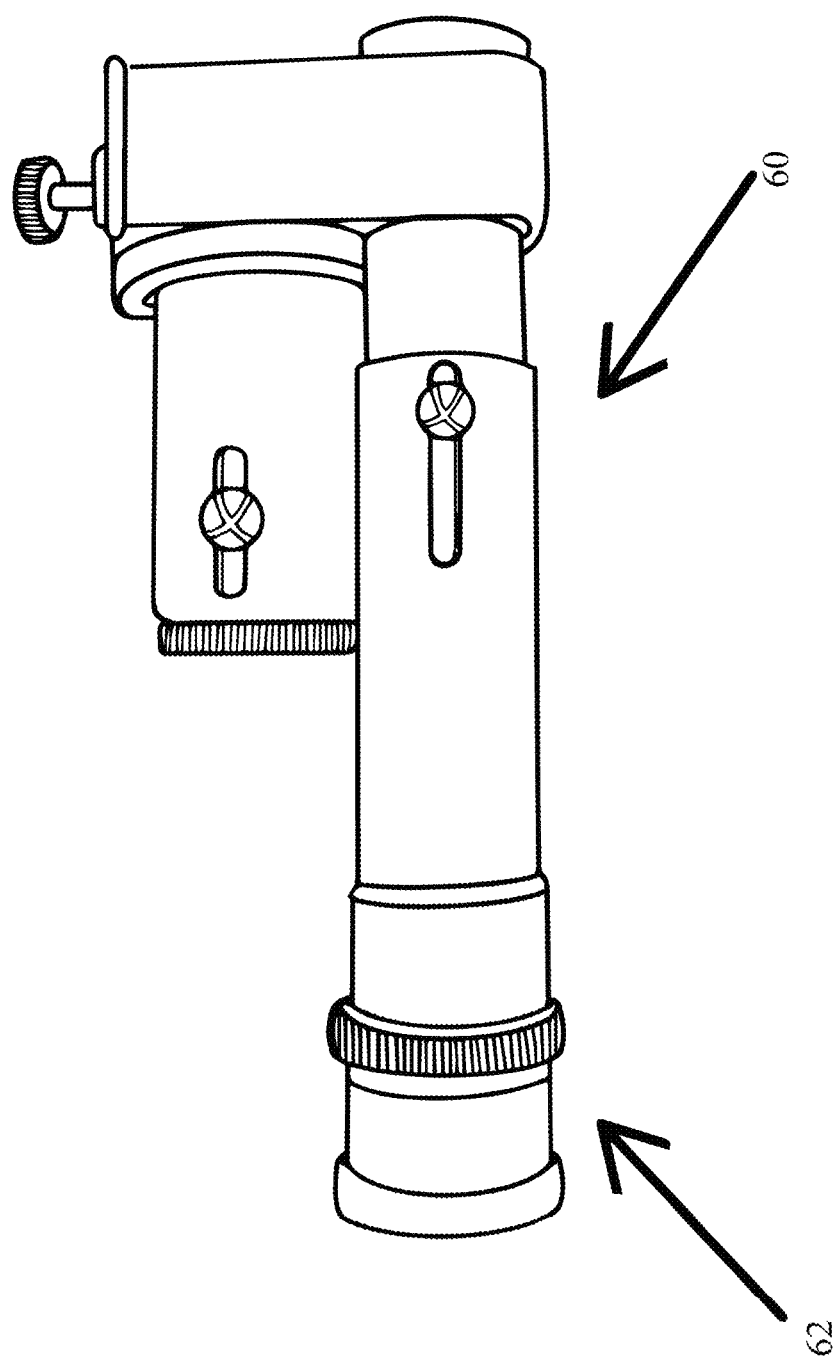
FIG. 6 is another side plan view of the exposure meter for use with the inventive means and the conventionally available camera of FIGS. 1-3.
Figure 7:
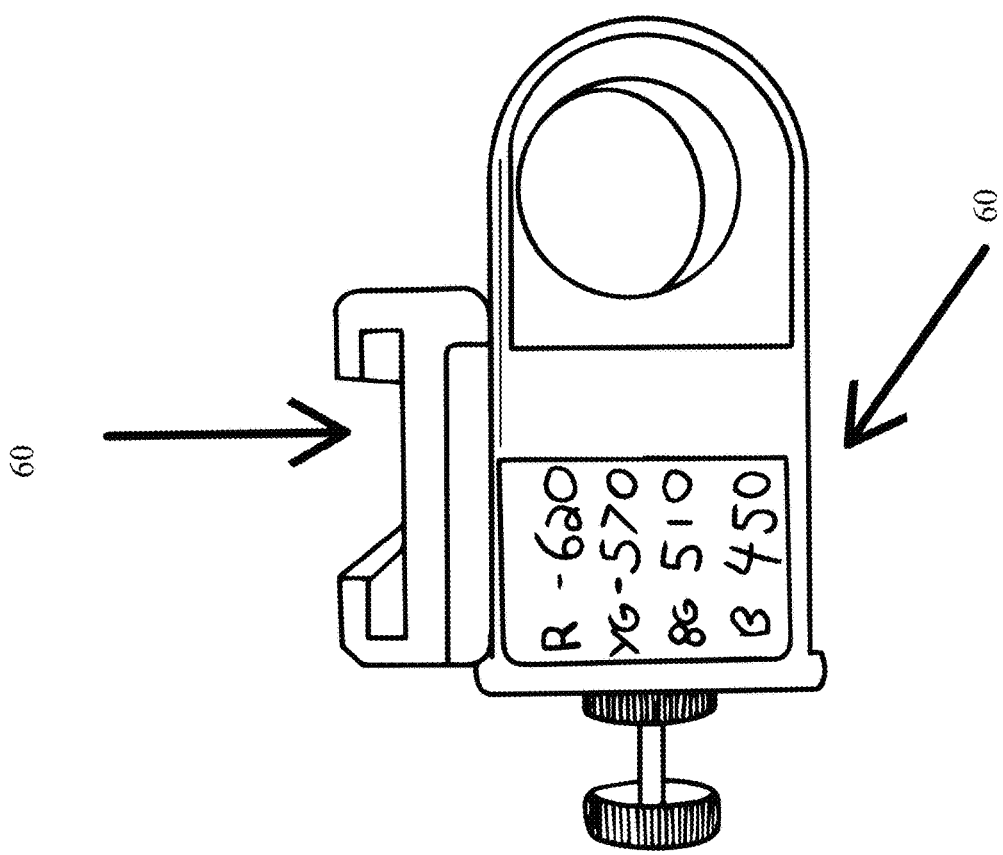
FIG. 7 is top plan view of the inventive exposure meter of FIGS. 4 & 6.
Figure 8:
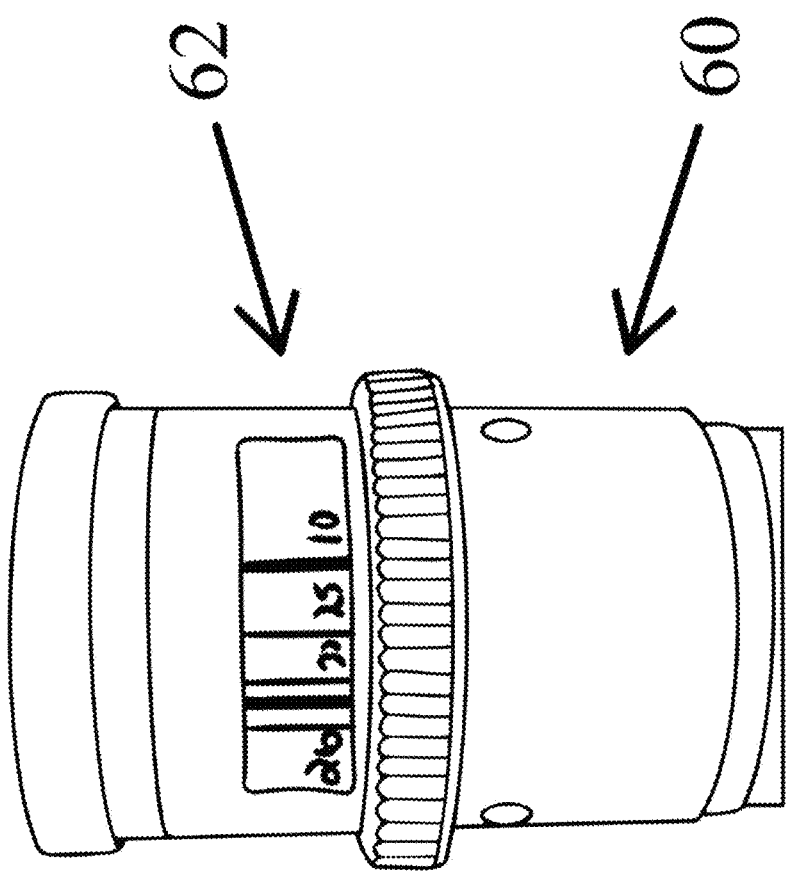
FIG. 8 is the a side plan view of the distal end section of the exposure meter contained with the perimeter of circle A-A' in FIGS. 4-5.
Figure 9:
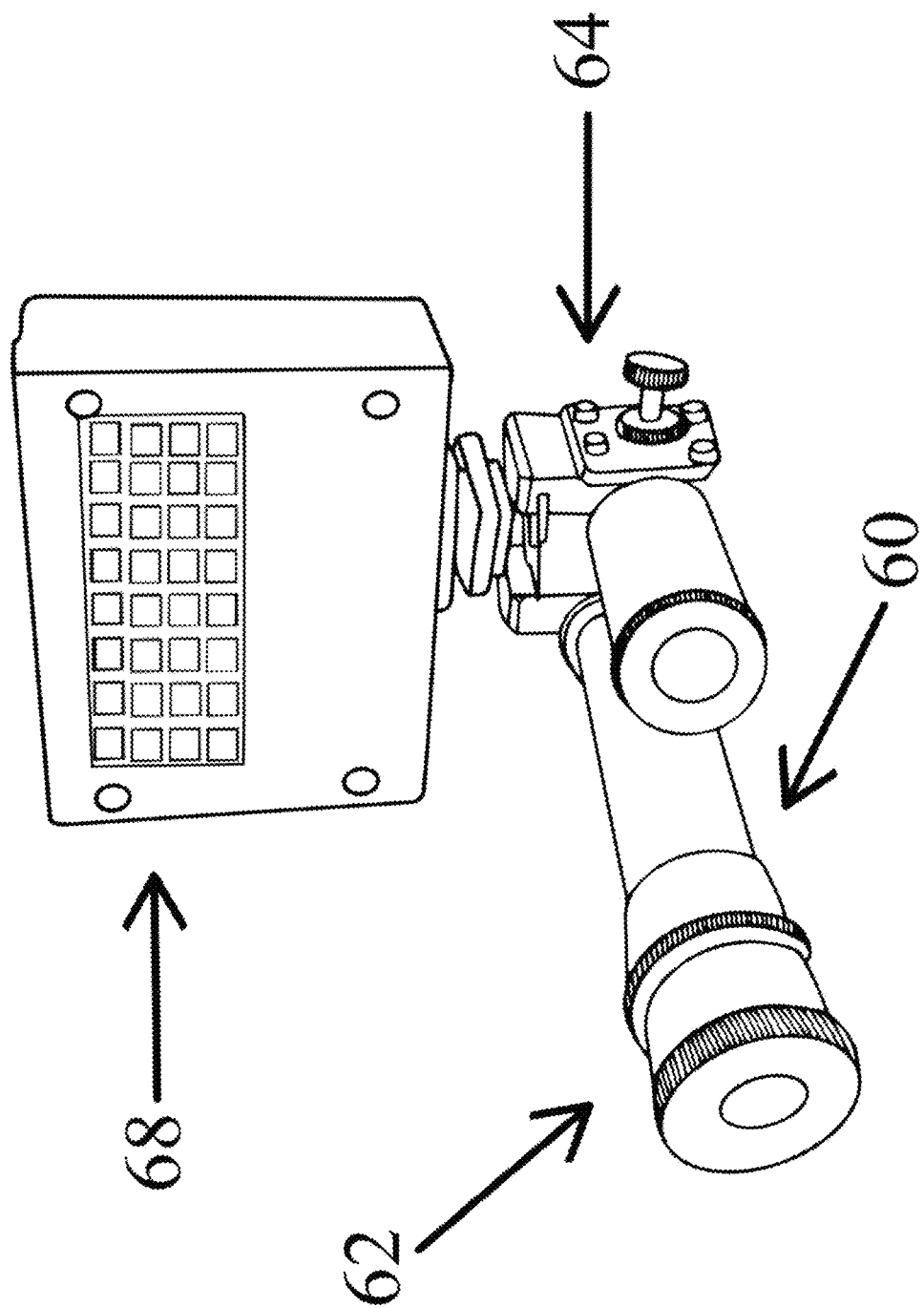
FIG. 9 is three-dimensional perspective view of the inventive exposure meter of FIG. 4 upon which is mounted a light source.
Figure 10:
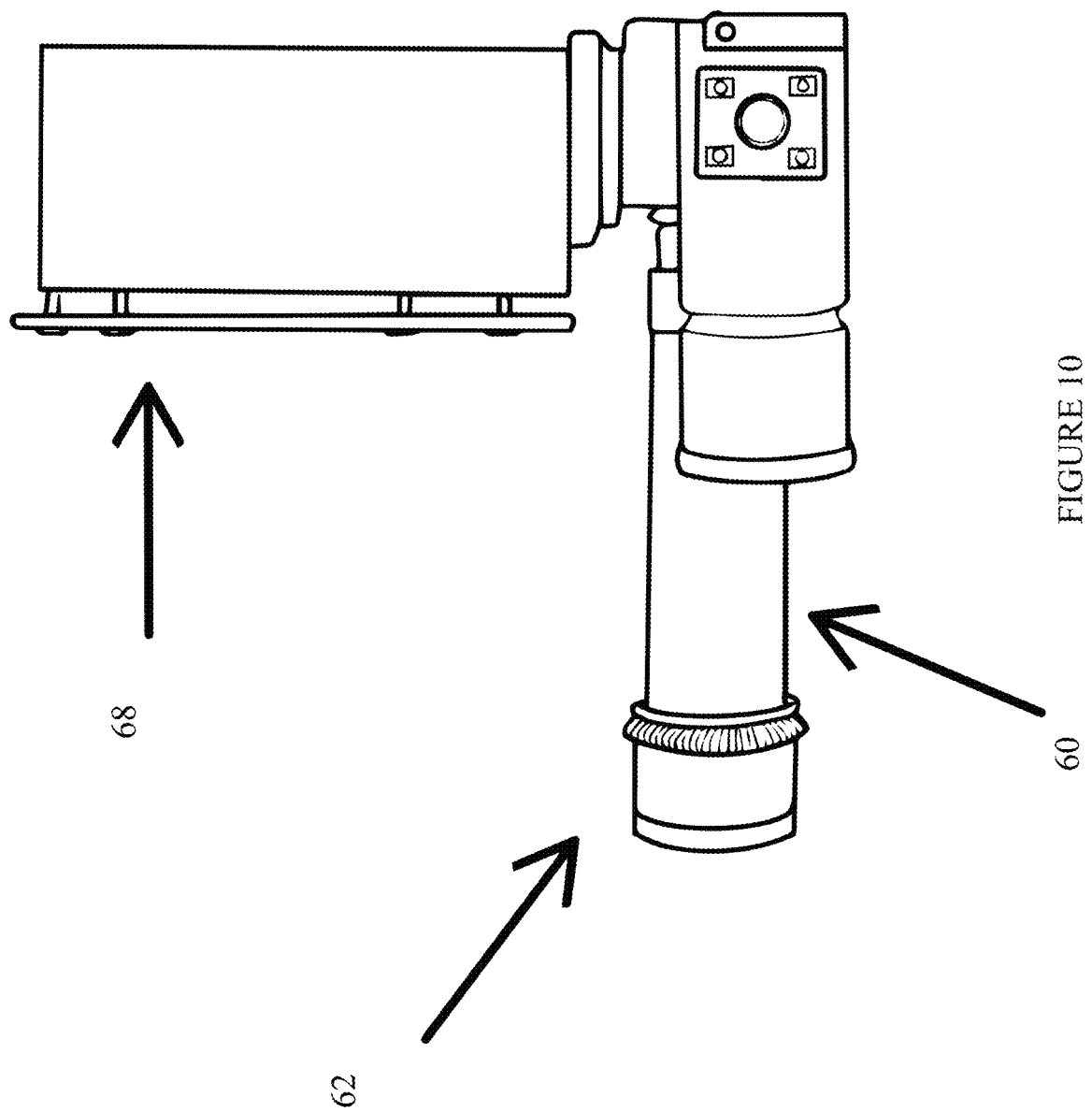
FIG. 10 is a side plan view of the inventive exposure meter and light source mounted thereon, which is depicted in FIG. 9.
Figure 11:
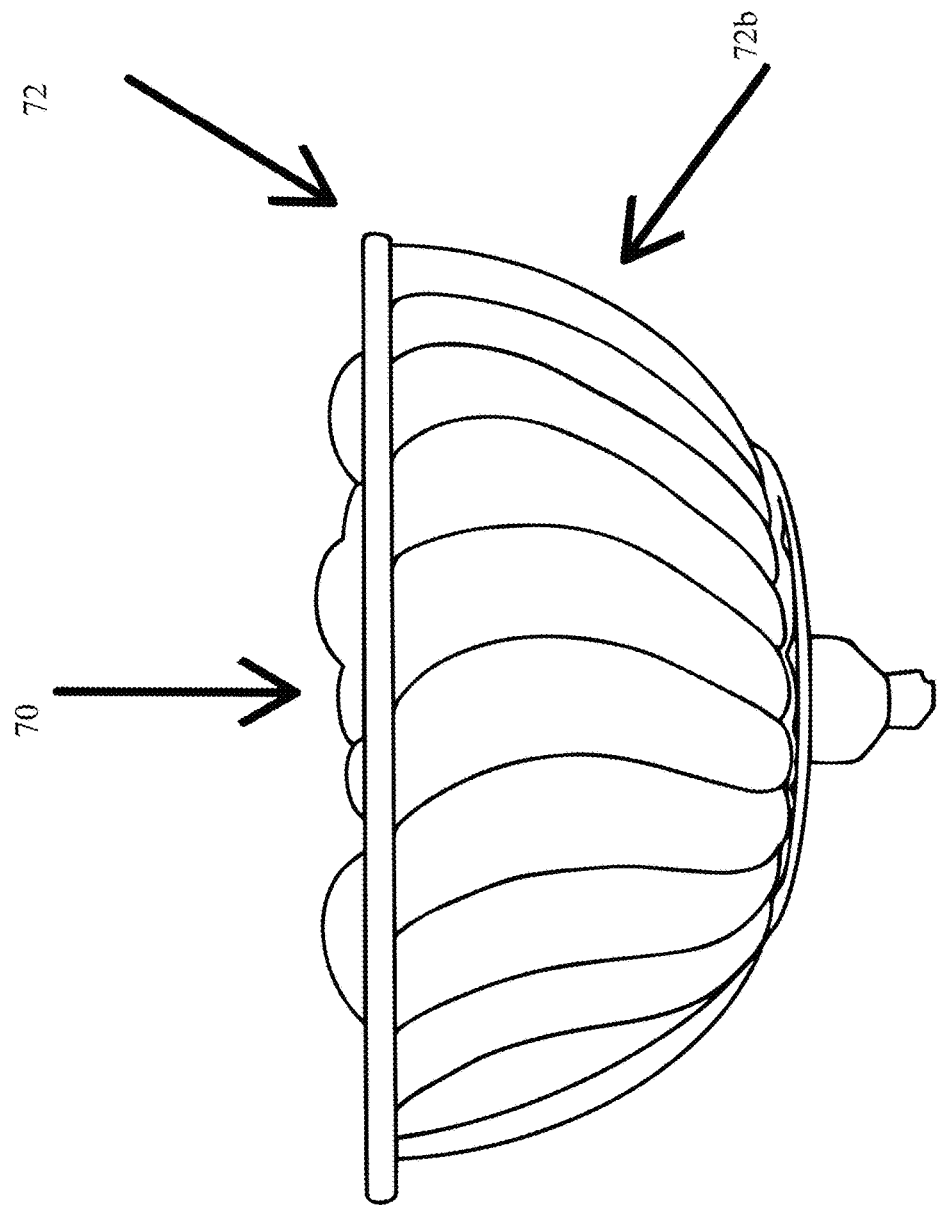
FIG. 11 is a side plan, view of the inventive light fixture to be used in connection with the inventive means and conventionally available camera of FIGS. 1-3.
Figure 12:
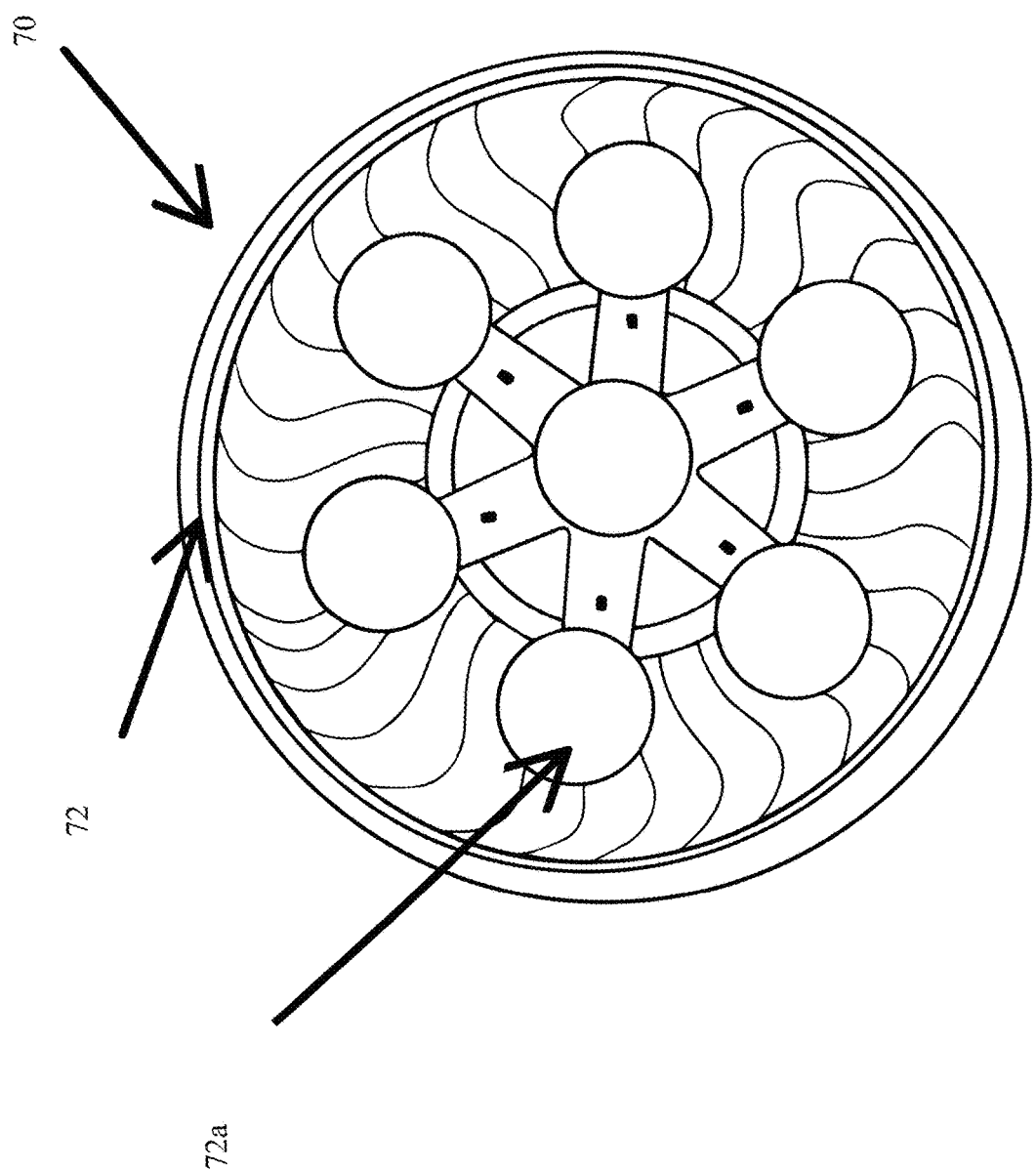
FIG. 12 is a top view of the inventive light fixture to be used in connection with the inventive means and conventionally available camera of FIGS. 1-3.
Figure 13:
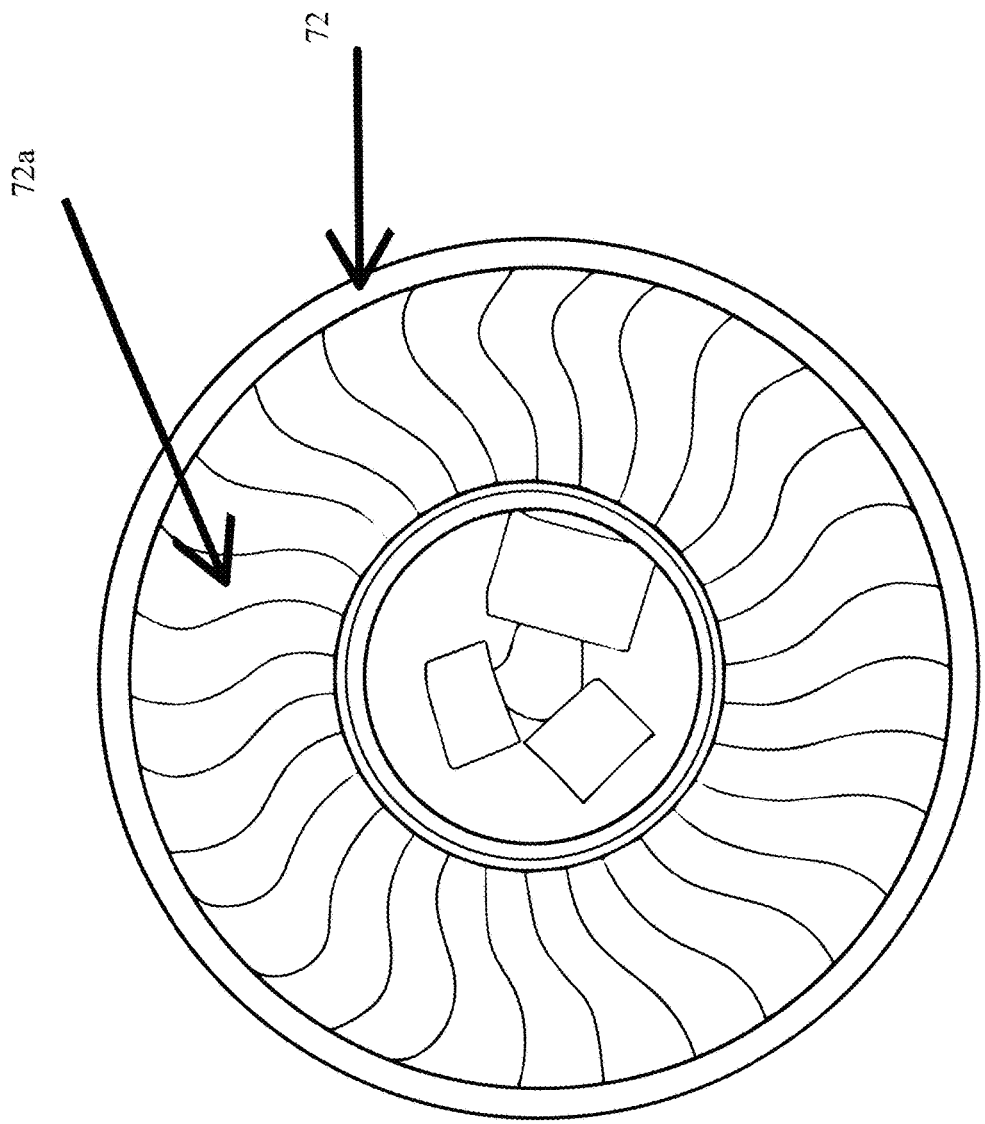
FIG. 13 is a top view of one component of said inventive light fixture of FIG. 12.
Figure 14:
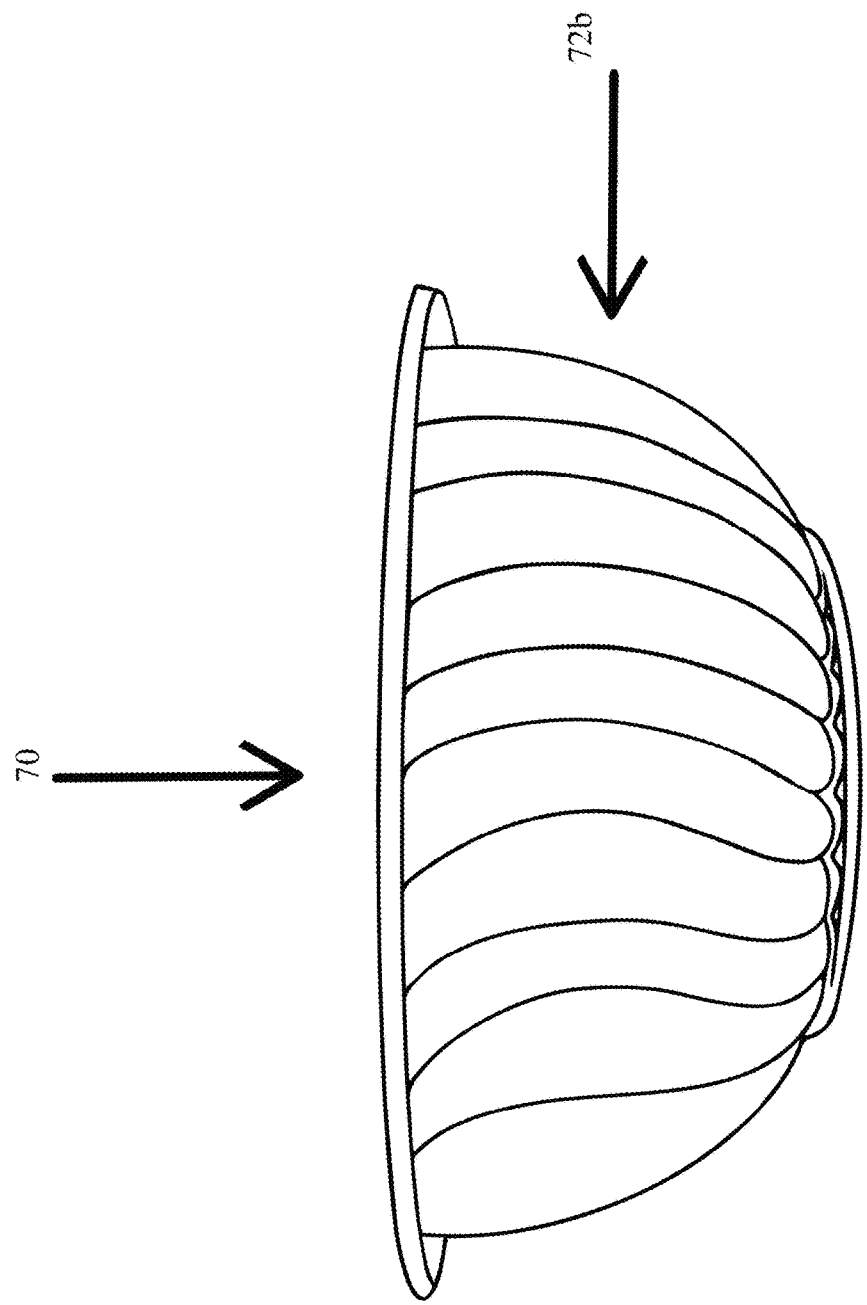
FIG. 14 is a side view of the component of said inventive light fixture of FIG. 13.
Figure 15:
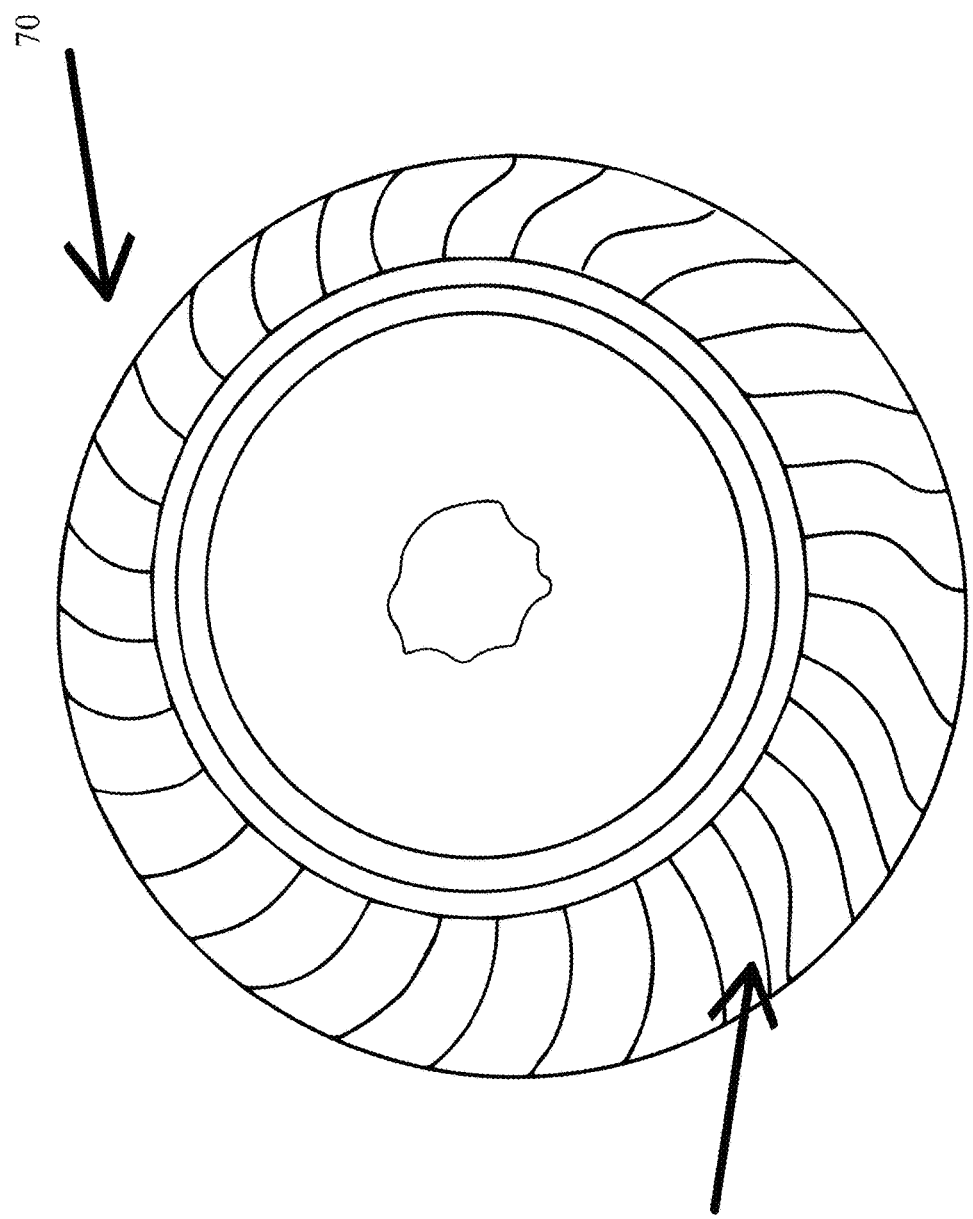
FIG. 15 a bottom view of the component of said inventive light fixture of FIG. 13.
Figure 16:
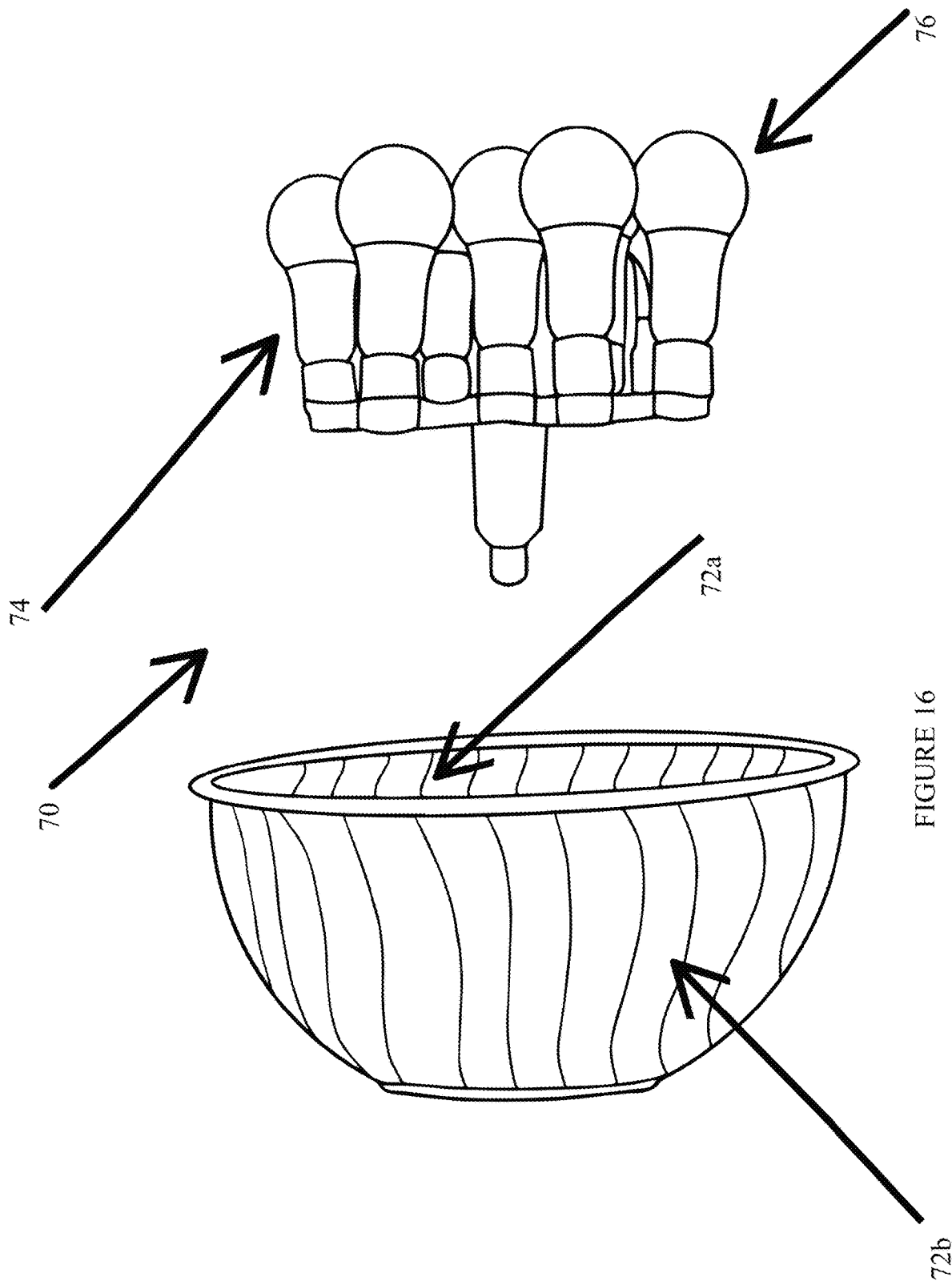
FIG. 16 is an exploded side plan view of the inventive light fixture of FIGS. 11-12.
Figure 17:
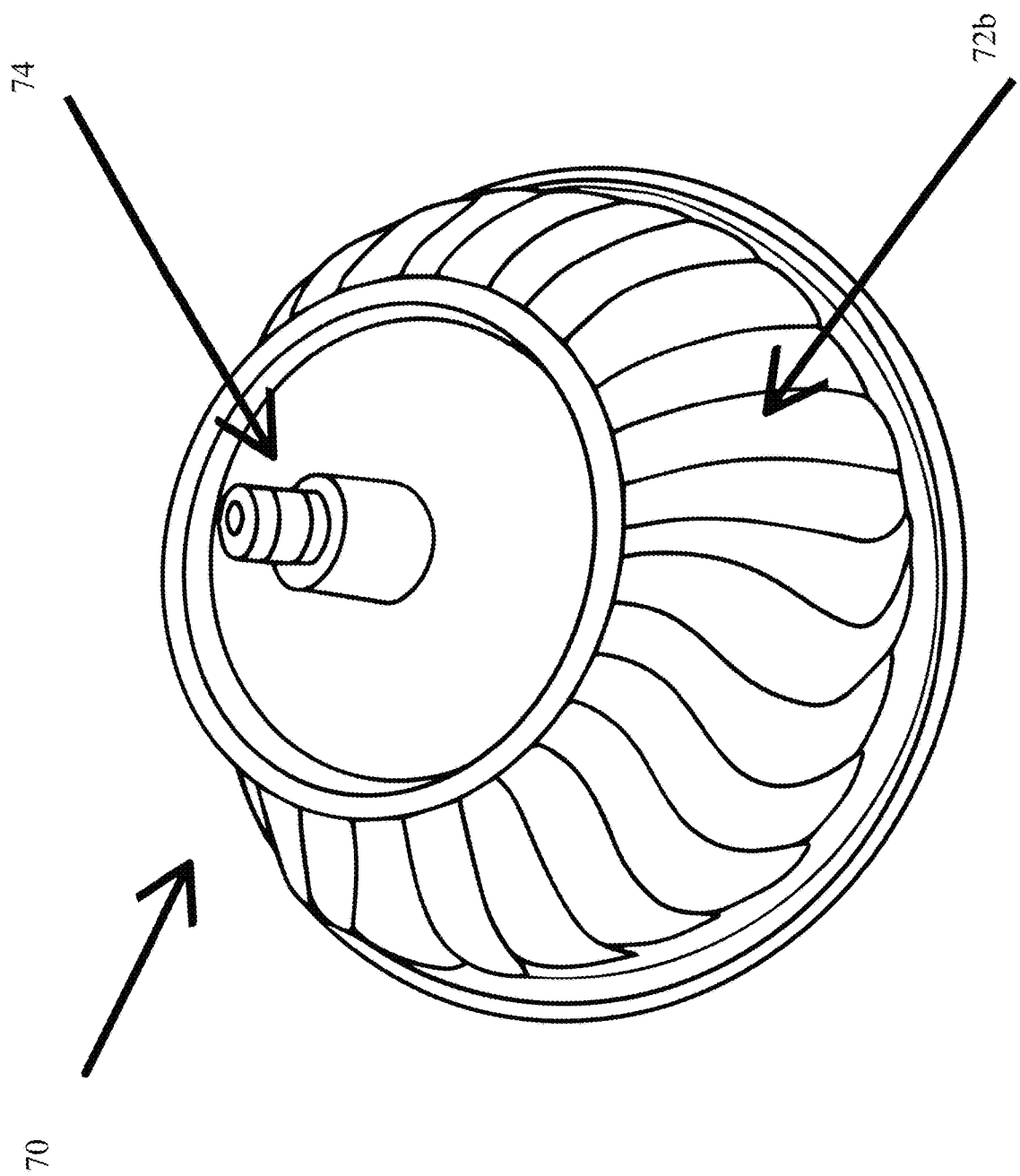
FIG. 17 is a bottom plain view of the inventive light fixture of FIGS. 11-12.
Figure 18:
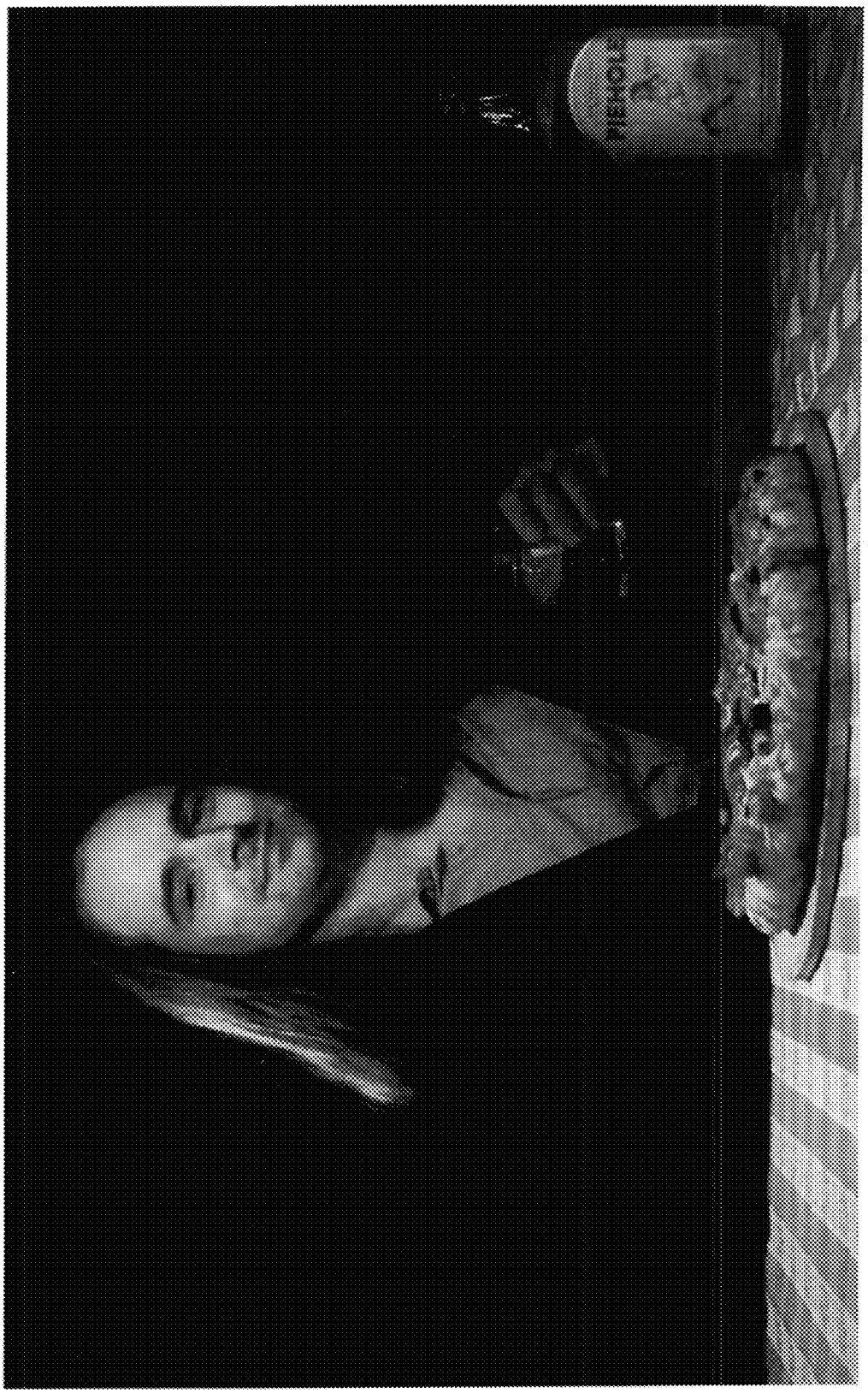
FIG. 18 is a photograph of a first subject generated with a conventional camera (Prior Art).
Figure 19:
FIG. 19 is a photograph of the first subject of FIG. 18, generated with a conventional camera outfitted with the inventive means of FIGS. 1-17, with high contrast, supersaturated, vibrant colors.
Figure 20:
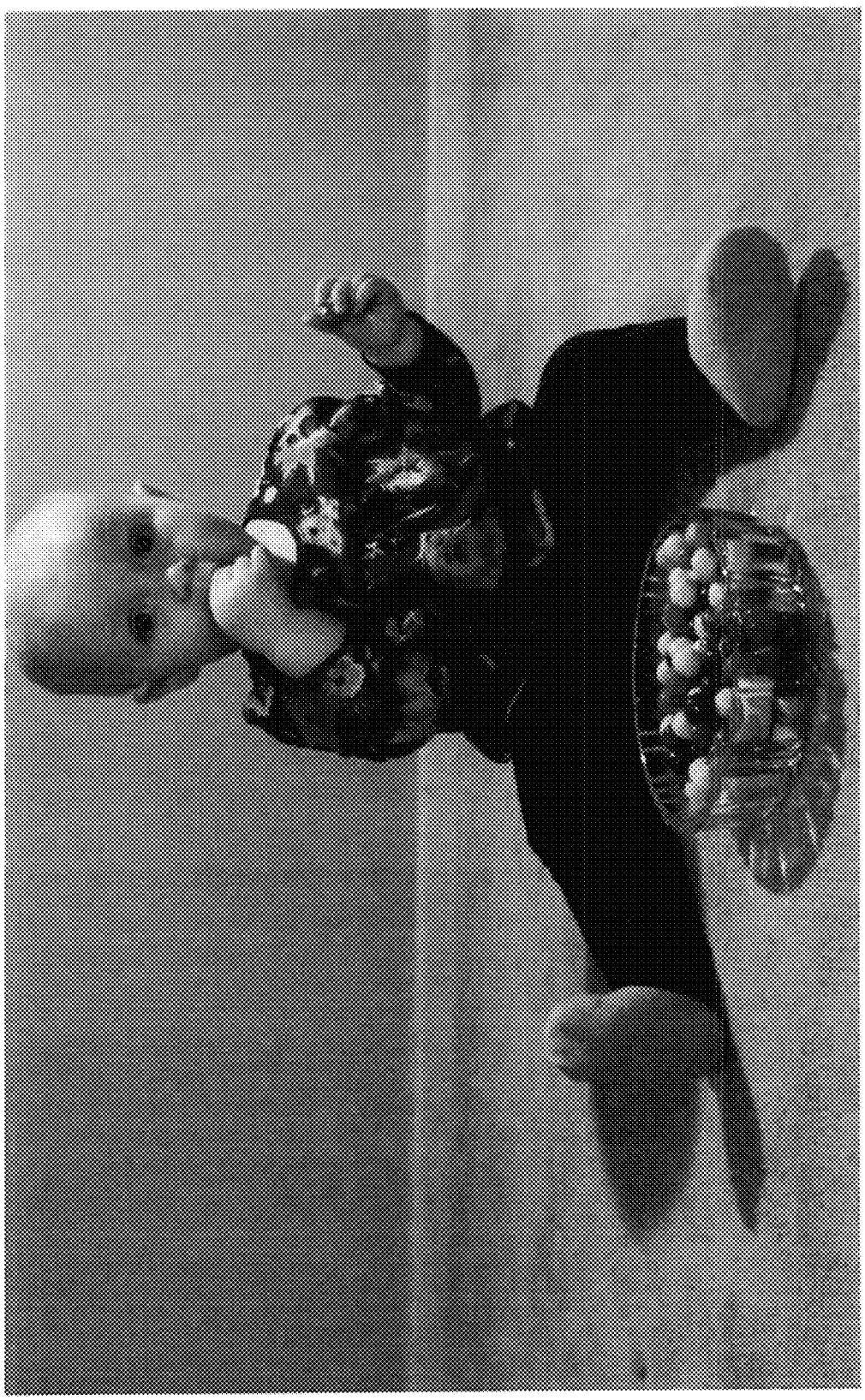
FIG. 20 is a photograph of a second subject generated with a conventional camera (Prior Art).
Figure 21:
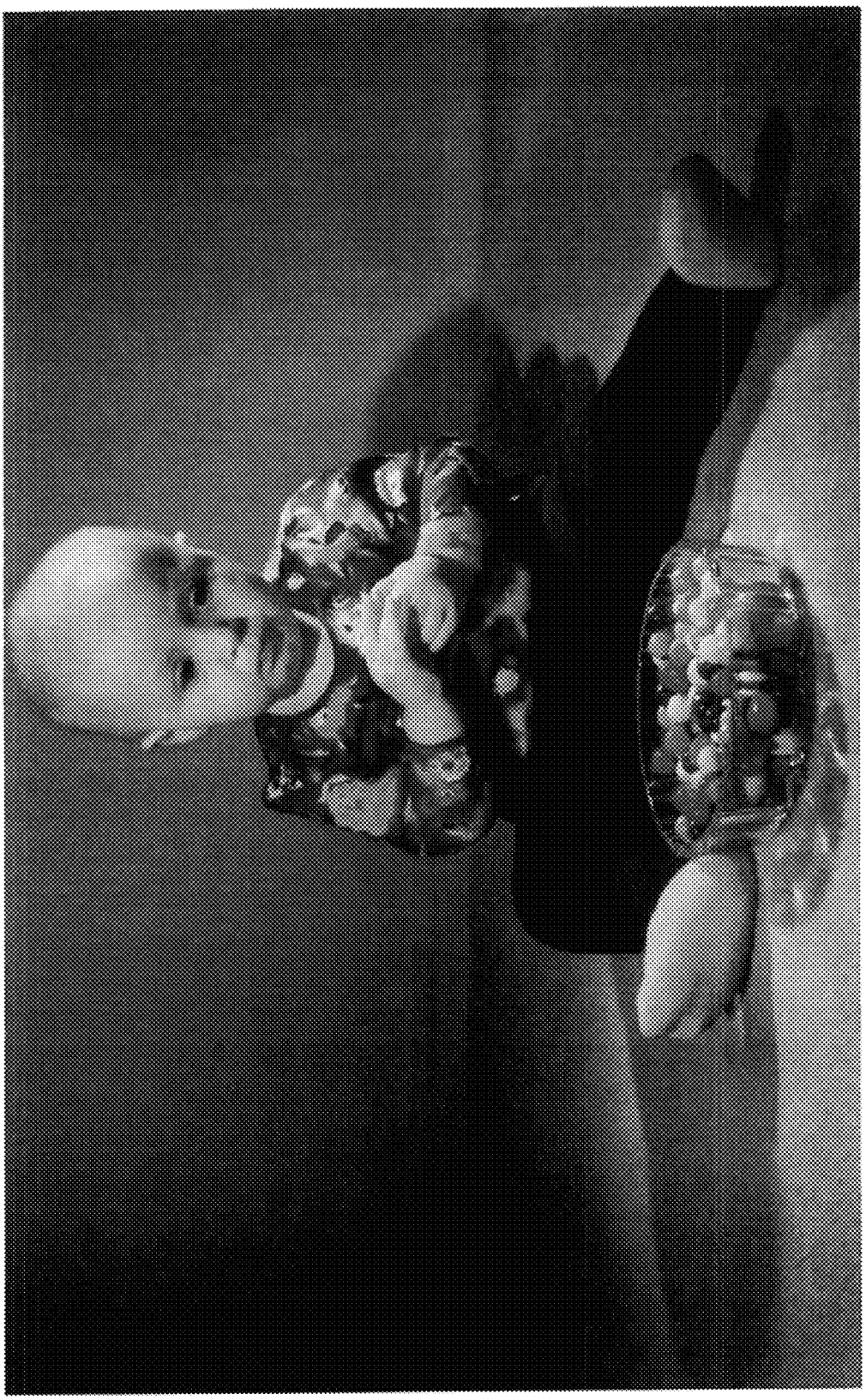
FIG. 21 is a photograph of the second subject of FIG. 20, generated with a conventional camera outfitted with the inventive means of FIGS. 1-17, said photograph showing high contrast, supersaturated, vibrant colors.
Figure 22:
FIG. 22 is a photograph of a third subject generated with a conventional (Prior Art).
Figure 23:
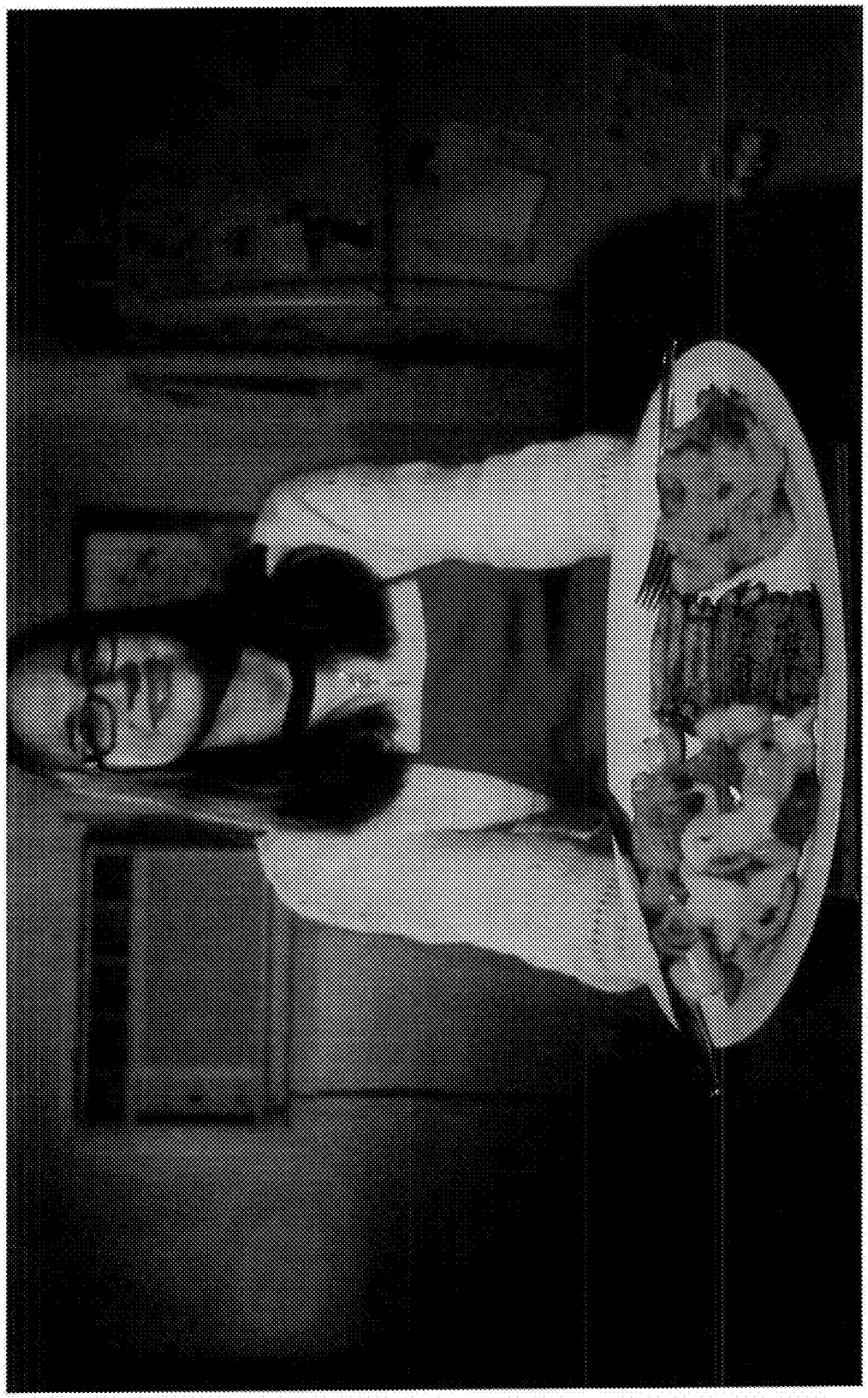
FIG. 23 is a photograph of the third subject of FIG. 22, generated with a conventional camera outfitted with the inventive means of FIGS. 1-17, said photograph showing high contrast, supersaturated, vibrant colors.
Figure 24:
FIG. 24 is a photograph of a fourth subject generated with a conventional camera (Prior Art).
Figure 25:
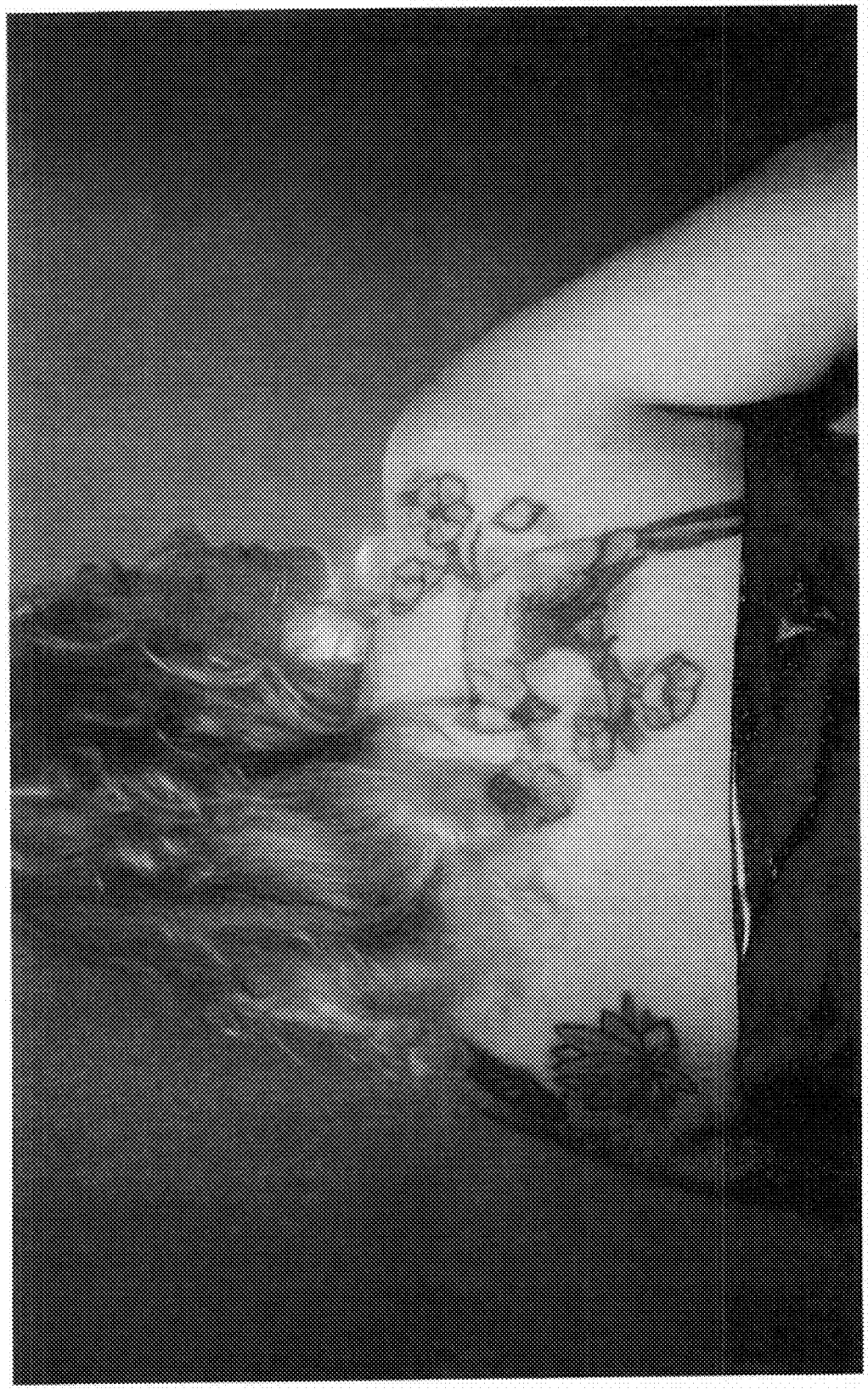
FIG. 25 is a photograph of the fourth subject of FIG. 24, generated with conventional camera outfitted with the inventive means of FIGS. 1-17, said photograph showing high contrast, supersaturated, vibrant colors.

Referring to FIGS. 1-3, they generally depict at 10, at least one embodiment of the means used to create works having the same creative look and feel as works filmed via the original Technicolor® three-strip filming process. Said means comprises a camera with a lens 20, a step-up lens-filter adapter ring 30, a diffusion filter 40, and an optical band-stop filter 50.

The step-up lens-filter adapter ring 30 ("adapter") is mounted on and fastened to the lens of the camera 20 for the purpose of eliminating vignetting around the edges of the final image. Vignetting is the darkening of the corners of an image when compared to the center of the image. Some lenses can introduce heavy vignetting if filters are used, especially circular polarizing filters that tend to be thicker than regular ones. For example, one such lens is the Nikkor 16-35 mm f/4G VR, which has vignetting issues at 16 mm even without filters when shot at its widest aperture of f/4. The effect of vignetting gets much worse when a filter is attached and if the filter is thick enough, even stopping down the lens to f/8 does not reduce it. Other lenses might be better at handling filters, but they also start showing issues when more than one filter is used, or a filter holder system is used. If the filter holder is attached to another filter, vignetting gets very heavy, requiring cropping later. And if a filter system is too thick, vignetting can be really bad. Using the step-up adapter 30 in the present invention eliminates the vignetting around the edges of the final image.

As set forth above, the means 10 for creating works having the characteristic look and feel of films generated via the Technicolor® process further comprises a diffusion filter 40, which is mounted on and fastened to the adapter 30. In one of the preferred embodiments of the invention, the diffusion filter 40 is a Tiffen 77 Glimmerglass 5 Filter. In another one of the preferred embodiments, the diffusion filter 40 is a Tiffen 77 Glimmerglass 3 Filter. Said diffusion filter 40 is a type of filter whose inclusion in the invention mimics the effect of traditional silver nitrate film used in the Technicolor® process.

Using silver nitrate films was Technicolor's attempt to get color to show up on film. It turns out that use of the silver nitrate films also wound up exaggerating the effects. It added halation to the images and enabled all primary colors to glow bright and vibrant while all secondary colors remained neutral. It also unexpectedly added a beautiful glow to everything. The Tiffen Glimmerglass® filter are described as diffusion type filters that soften the fine details in a unique manner while adding a mild glow to highlight the images. The filters have a distinct silver sparkle. Using in the present invention diffusion filters such as the Tiffen Glimmerglass® filters similarly exaggerates the effect of the present invention in a manner that is similar to the Technicolor® process.

As is further set forth above, the means 10 for creating works having the characteristic look and feel of films generated via the Technicolor® process also comprises an optical band-stop filter 50. It is mounted on and fastened to the front of the diffusion filter 40. In fact, as is shown in FIGS. 1-3, the diffusion filter 40 is always behind said optical band-stop filter 50.

The optical band-stop filter 50 is an inventive filter capable of removing or blocking yellow color, i.e., light having a wavelength of about 575-600 nm. It is a type of optical filter which passes most wavelengths of light or frequencies unaltered and rejects or blocks those in the 575-600 range. It is made-to-order for use in the inventive process discussed below. It is a custom made allegedly didymium filter. Didymium filters were originally developed to block a yellowing light of approximately 589 nm which was emitted by hot sodium in molten glass. The filters experienced a rebirth in the 1990s as fall color intensifiers. With the advent of digital cameras, however, interest in these filters trailed off (see https://hoyafilterusa.com/how-intensifier-filters-work/). Whether it is, or it is not in fact a didymium filter, the properties and characteristics of this custom made optical band-stop filter that are useful in the present inventive means and process is the fact that it blocks light having a wavelength of 575-600 nm and it reduces to a negligent level more wavelengths of impure yellow-green and yellow orange light thereby purifying the red, blue and green light registered by a camera. Any filter made of didymium or not, capable of among other things, similarly blocking light having a wavelength range of 575-600 nm and able to be used in the inventive process set forth below could be used as an optical band-stop 50.

Figure 27:
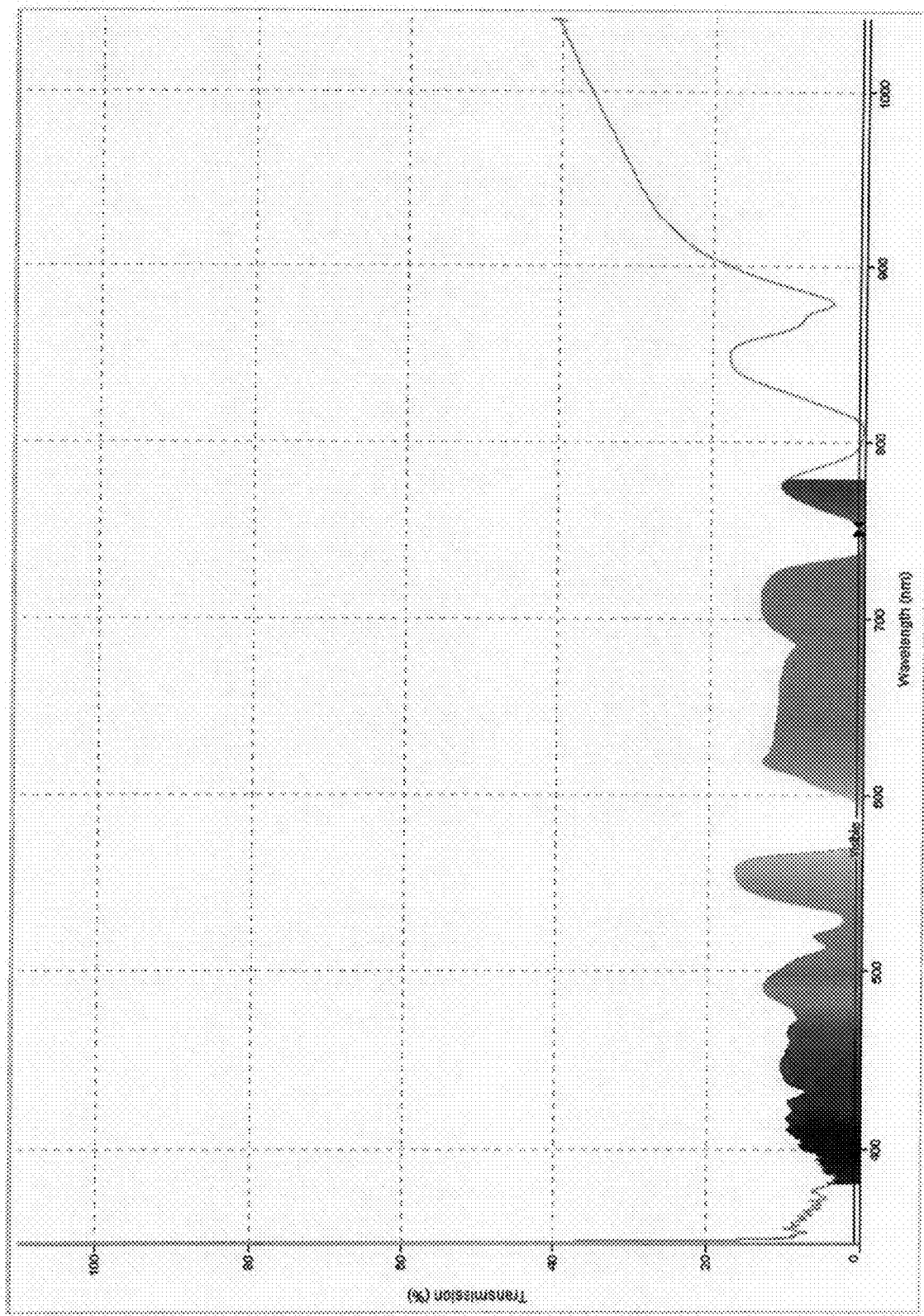

In the preferred embodiment of the inventive means 10, the optical band-stop filter 50 completely prevents the transmission of the yellow light wavelengths in the range between 570 nm to 600 nm. As is shown in FIG. 27, all other wavelengths of light including the majority of the visible spectrum, ultraviolet light, and infrared light pass through the inventive optical band-stop filter 50. By comparison, none of the yellow passes through. By eliminating not only the pure yellow light, but more wavelengths of impure yellow-green and yellow-orange light, said optical hand-stop filter 50 allows for the transmission and differentiation of only pure red, blue, and green light through it and into the lens of the camera 20.

The optical band-stop filter 50 was tested in a lab to confirm through spectrophotometry that it is, in fact, a band-stop filter and that the transmission spectrum observed through the filter is purified red, blue and green light. Also tested for comparison purposes was a commercially available color intensifying lens, i.e. the Singh-Ray LB Color Intensifier, which while capable of giving images a pleasing, subtle, extra pop, does not result in images having a Technicolor® look.

Figure 29:
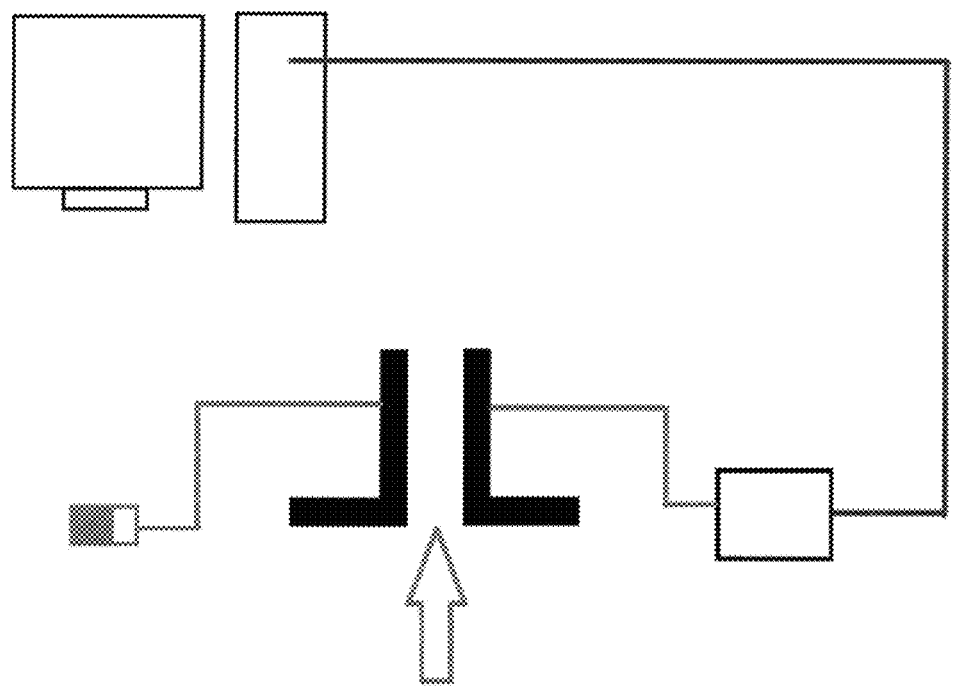
FIG. 29 is a schematic of the laboratory set up used to test the invention.

The equipment used to test both the optical band-stop filter 50, and the Singh-Ray LB Color Intensifier comprised a USB4000 Fiber Spectrophotometer equipped with an LS-1 Series Tungsten Halogen light source, an adjustable collimating filter holder, and the Ocean Optics SpectraSuite (see FIG. 29).

The procedure for the testing of both the inventive optical hand-stop 50 and the Singh-Ray LB Color Intensifier comprised the following steps:

A. The Tungsten Halogen light source was turned on and allowed to come to steady state in approximately 30 min;

B. The computer was turned on and the USB 2.0 cable of the Spectrometer was connected to the computer;

C. The SpectraSuite® software was opened and the spectrometer appeared and was accessible via the graphic user interface;

D. Then, via Graphics layer options, the visible spectrum layer was made visible and clipped to the trendline;

E. The fiber optic cable was connected to the Adjustable Collimating filter Holder so that light from the Tungsten Halogen light source has a clear path to the fiber optic cable. A thin Teflon disc was inserted into the light path of the light source to reduce the light intensity without shifting the color spectrum;

F. The trendline was calibrated by vary the integration time, scans to average, and boxcar width independently. Varying the integration time changed the amount of time that the computer is receiving the data for each scan allowing more data to be collected over the longer integration time. Increasing the scans to average decreased the variability of the noise in the graph because the software averaged multiple scans into one data point rather than generating a data point from an individual scan. Boxcar width averaged the lateral data points to further decrease the noise in the graph;

G. It was then necessary to store a dark spectrum and reference spectrum with no sample present before beginning testing. A dark spectrum was stored by blocking the light source from the spectrometer (by blocking the light source rather than turning it off in order to maintain its steady state). A reference spectrum was stored when the light source was not blocked;

H. The software is then placed in Transmission Spectrum mode. A new dark and reference spectrum were taken without a sample present.

I. Then, the first sample was placed in the Adjustable Collimating Lens Holder. The image file of the graph was saved, and the spectral data was recorded;

J. The second sample was placed in the Adjustable Collimating Lens Holder. The image file of the graph was saved, and the spectral data was recorded; and K. This data was then processed in Matlab®.

FIG. 29 shows the approximate laboratory set up. The computer was connected via USB cable (blue line) to the USB4000 fiber spectrometer (black rectangle). The LS-1 Series Tungsten Halogen light source provided the light to the samples via a fiber-optic cable. The fiberoptic cable was mounted exactly level and aligned to a second fiberoptic cable by the Adjustable Collimating Lens Holder (black L figures). The samples were placed individually in between the brackets of the Adjustable Collimating Lens Holder as indicated by the red arrow. The light that could be transmitted through the samples traveled through the second fiber optic cable to the spectrophotometer which generated the data displayed on the computer.

Figure 28:
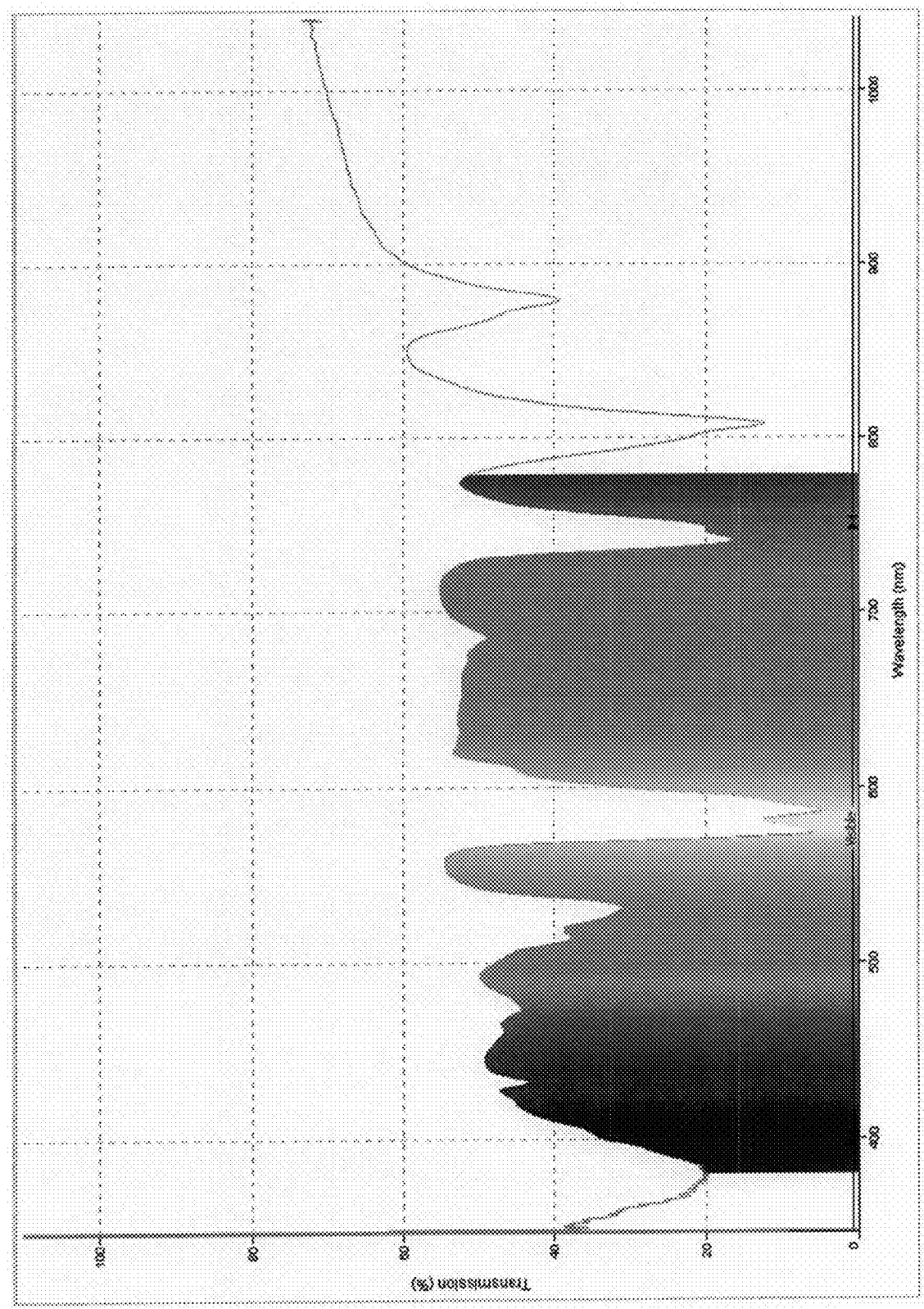

FIG. 28 comprises the transmission spectra of the Singh-Ray LB Color Intensifier (prior art) tested via the procedure described hereinabove. The vertical axis of this plot is the Transmission in percentage. The horizontal axis of this plot is the Wavelength of the light in nanometers. The visible light spectrum is indicated by the rainbow of colors under the trendline. At longer (higher) wavelengths to the right of the visible light spectrum, the trendline shows infrared light. At shorter (lower) wavelengths to the left of the visible light spectrum, the trendline shows ultraviolet light. On average, this filter allowed roughly 50-60% light to transmit through it. The yellow light in approximately 575 nm to 600 nm range is decreased but still present.

FIG. 27 comprises the transmission spectra of the inventive optical band-stop filter 50. Once again, the vertical axis of this plot is the Transmission in percentage. The horizontal axis of this plot is the Wavelength of the light in nanometers. The visible light spectrum is indicated by the rainbow of colors under the trendline. At longer (higher) wavelengths to the right of the visible light spectrum, the trendline shows infrared light. At shorter (lower) wavelengths to the left of the visible light spectrum, the trendline shows ultraviolet light. On average, this filter allowed roughly 17% and no more than 20% light to transmit through it. The yellow light at approximately 570 nm to 600 nm range is nearly completely eliminated.

Both the inventive optical band-stop filter 50 and the commercially available Singh-Ray Filter (prior art) reduce the overall amount of light that is permitted to pass through to the spectrophotometer. However, the overall amount of light that passes through the inventive optical band-stop filter 50 is significantly less than the amount of light that passes through the Singh-Ray Filter.

Figure 26:
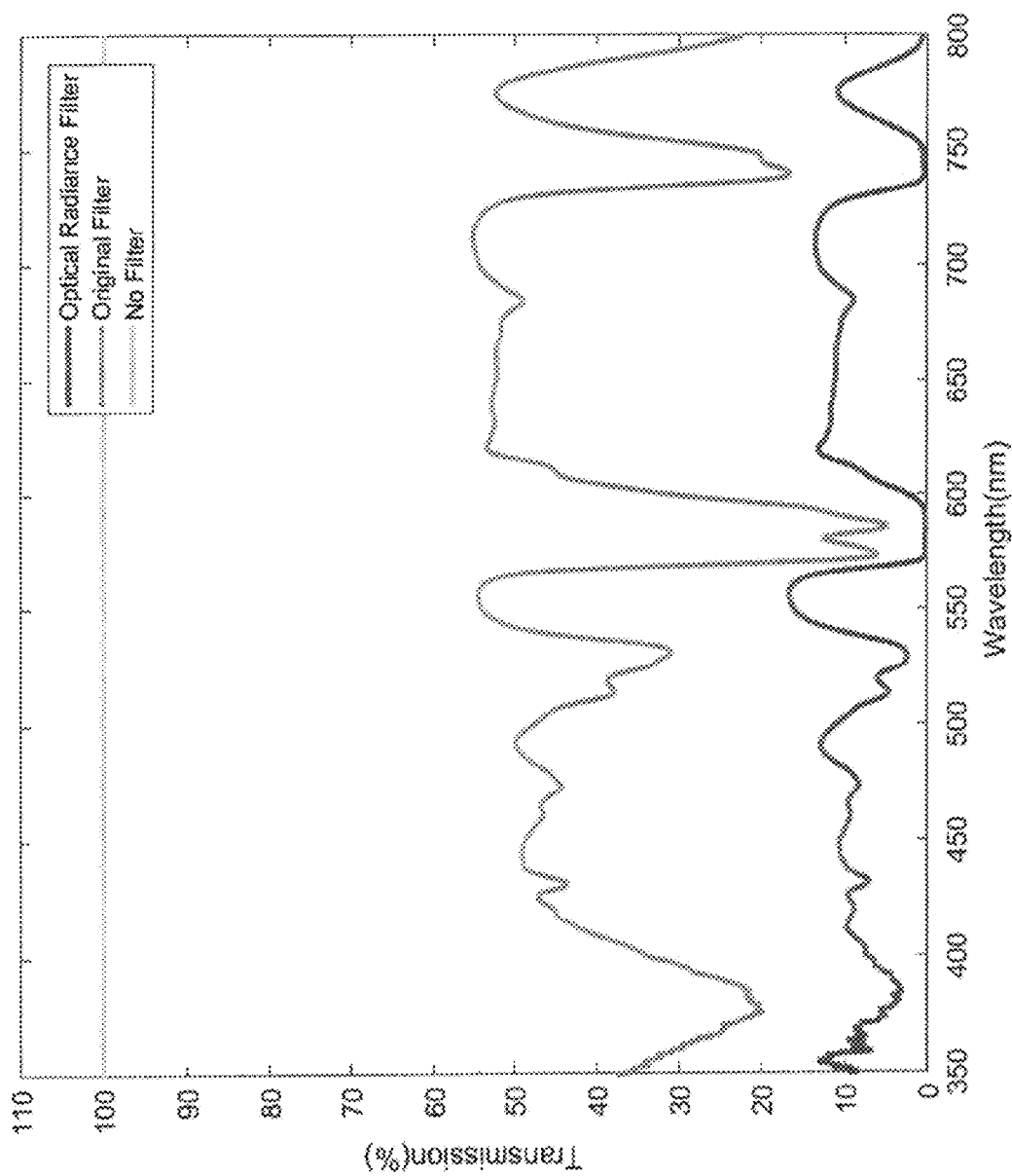
FIGS. 26-28 are light transmission spectra.

FIG. 26 comprises a plot of the transmission spectra of both the optical band-stop filter 50 and the Singh-Ray LB Color Intensifier (prior art). This plot was generated in Matlab. The tests of each of the individual samples produced 3,648 individual data points, each of those data points having are x-component and y-component. The vertical axis of this plot is the Transmission in percentage. The horizontal axis of this plot is the Wavelength of the light in nanometers. The wavelengths of the visible light spectrum range from approximately 390 nm to 780 nm. Within the visible light spectrum, pure yellow light ranges from approximately 577 nm to 597 nm with impure yellow-orange and yellow-green light in the surrounding +/−10 nm. Both of the tested filter samples and the no filter 100% transmission are shown in this plot. The two tested filter samples, the inventive optical band-stop filter 50 and the Singh-Ray Filter (prior art), allowed significantly less light to pass through the spectrophotometer than if there were no filter in place at all. However, the inventive optical band-stop filter 50 allowed approximately two thirds less the amount of light to transmit through it, than the Singh-Ray Filter (prior art) and it totally eliminated all yellow light.

There are a number of conclusions that can be drawn from the data taken by the spectrophotometer. Only the inventive optical band-stop filter 50 is a total band-stop filter, stopping all yellow light wavelengths from moving through it. The Singh-Ray Filter (prior art) only partially stops yellow light from passing through. All other wavelengths of light including the visible spectrum, ultraviolet light, and infrared light pass through both filters. This evidence is clearly indicative of the band-stop type of filter that the optical band-stop filter 50 is, as opposed to being a bandpass filter.

However, because of the unique construction of inventive optical band-stop filter 50, only 20% of the amount of light shone on it, is capable of being transmitted through it. Because it allows only 20% of the light shone on it to pass through, use of a filter exhibiting the same light transmission properties as that of the inventive optical band-stop filter 50, runs counter to conventional wisdom and customary practices in the photography/videography trade—tribal knowledge. On the other hand, exactly because the inventive optical band-stop filter 50 transmits no more than 20% of the light shone on it, not only does it eliminate pure yellow light, but it also eliminates more wavelengths of impure yellow-green and yellow-orange light and better separates the blue from the greens. As a result, it only allows the transmission of pure red, blue, and green light.

As was discussed in the prior art section above, digital cinema cameras are designed to work well in low light, thereby bringing down the cost of lighting and the heat it generates on sets. But to work well in low light, each photosite in the cameras has a fairly weak color filter, letting in more wavelengths than it should to add to the overall volume of light collected by the sensor. Using the inventive optical band-stop filter 50 with digital cinema cameras would simply not work, because it does not permit enough light, i.e., it only transmits 20%. Further, it stops the transmission of yellow light wavelengths, which in turn limits the total number of wavelengths to hit the digital cameras' photosites. Accordingly, while digital cinema cameras are designed to work well in low light, the inventive optical band-stop filter 50 reduces the amount of light and the wavelengths of light so much that digital cinema cameras would just not work with it. But yet, as is shown below the inventive optical band-stop filter 50 not only works with digital cinema cameras but produces works exhibiting vibrant red, green, and blue colors and appearances reminiscent of Golden Age Technicolor® works.

Camera designers no longer need to use complicated mathematical algorithms to squash and stretch the color signal in the camera after it's been recorded, because they no longer have to make up for the compromised sensor design. No need to recreate color definition, since all color definition has been properly recorded using the inventive optical band-stop filter 50. No need to un-mix and separate colors melded into brown because the inventive optical band-stop filter 50 allowed colors to recorded separately and purely.

The commercially available Singh-Ray Filter does not accomplish this. As shown in FIG. 28, despite removing most pure yellow light, the commercially available Singh-Ray Filter (prior art) still allows rough 12% of the yellow light to transmit through the filter and does not filter the less pure yellow-green and yellow-orange light.

The process of using the inventive means 10 to create works having the same creative look and feel as works filmed via the original Technicolor® three-strip filming process, comprises the following steps:

Picking a subject to be photographed or videotaped;
   Choosing and setting up lighting that remains at a low temperature throughout the entire process, but is capable of delivering light having a range between 4800 and 5600 Kelvin temperature, i.e., light that is the closest to real white light, true white light, capable of delivering the truest color information ("Lighting");
   Directing enough of the Lighting on the subject to be photographed, such that the light intensity on the subject to be photographed measures more than 100 foot candles. Foot candles are the most common unit of measurement used by lighting professionals to calculate light levels in business and outdoor spaces. A food candle is measurement of light intensity and is defined as the illuminance on one-square foot surface from a uniform source of light.
   Using a light meter to measure the number of foot-candles that are being illuminated on and hitting the subject to be photographed and to insure that the number of such foot-candles exceeds 100 foot-candles.
   Assembling the camera with a lens 20, the step-up lens-filter adapter ring 30, the diffusion filter 40, and the optical band-stop filter 50 described above;
   confirming that the light reaching the camera is bright enough and examining how all the different colors in the spectrum will expose; and
   photographing or videographing the subject chosen.

FIGS. 18-25 are photographs of subjects, each of the photographs of each subject having been taken using a conventional camera and process, and using the herein-described, inventive process and equipment, respectively. FIGS. 18, 20, 22 and 24 were taken using a conventional camera and process. FIGS. 19, 21, 23 and 25 were taken using the herein described inventive process and equipment. A comparison of FIGS. 18, 20, 22, and 24 to FIGS. 19, 21, 23, and 25 clearly shows that the latter Figures comprise high contrast, supersaturated, vibrant colors with an appearance that is reminiscent of photographs taken with the original Technicolor® three-strip process.

In one embodiment of the invention used in the process above, the camera was a Black Magic® pocket cinema camera. It is designed to shoot documentary footage inconspicuously. The camera comprises a high class imaging system found in any big camera or big production. In order for the manufacturer to install the high class imaging system within the small body of the camera, they stripped everything out of the camera. So what this camera records is only what the sensor sees. It does not apply any mathematical algorithms and computer processes. Its user gets to see exactly what the camera sees. The camera does not manipulate the image to achieve any particular look.

When shooting indoors, the lens 20 is wide open. The Iris of the lens has to be wide open. So when shooting inside, the lens is set at F 2.5 to allow all of the light through the lens. Additionally, shooting is done in manual mode at 24 frames per second at ISO 800, with a shutter of 144 degrees to keep one synced with the main to prevent flickering.

The type of lighting chosen to be used in conjunction with the inventive means and process set forth above, may include what is known as key lighting, fill lighting and back lighting. Such lighting may be enhanced or diffused by using reflectors. FIGS. 11-17 set forth an inventive light fixture 70 used as fill lighting to illuminate the subjects displayed in FIGS. 18-25. It comprises a clear bowl-shaped outer housing 72, having an inner surface 72A and an outer surface 72B, mirrorized with a commercially available mirrorizing paint. A number of commercially available mirrorizing spray paints were tested to create the mirrorized outer surface 72B. In the preferred embodiment of the lighting fixture, the preferred mirrorizing spray paint used on outer surface 72B was RUSTOLEUM® MIRROR EFFECT, silver, SKU NO. 267727 because the light reflected therefrom had the best spectral response. It was applied on outer surface 72B of the clear bowl-shaped outer housing 72, in accordance with the manufacturer's application procedure set forth in its Technical Data Sheet SPC-36, https://www.rustoleum.com/~/media/DigitalEncyclopedia/Documents/RustoleumUSA/TDS/English/CBG/Specialty/SPC-36_Mirror_Effect_TDS.ashx, the contents of which are repeated, realleged and incorporated in their totally as if more fully set forth herein.

Likewise, the reflectors used to enhance or diffuse the lighting in the inventive process set forth above, were also custom made using RUSTOLEUM® MIRROR EFFECT, silver, SKU NO. 267727 because the light reflected therefrom had the best spectral response. The reflectors were created by securing a light, inexpensive backing, stiff and pliable enough to form bendable panels and spraying the reflecting light surface with the mirrorizing spray paint. In one example of a reflector made in the foregoing manner, the backing was cardboard that was bent to form three panels sufficient stiff to stand on the floor and capable of being sprayed with the mirrorizing spray paint.

Mounted within said bowl-shaped outer housing 72 is a candelabra style fixture 74 capable of receiving more than one bulb. In the preferred embodiment said light fixture 74 houses 7 bulbs. The bulbs 76 are Hypericon® A21 LED BULBS having an extended CRI of 90 or higher, capable of providing R-9 and an unbroken spectrum of light, such light capable of working in daylight balance between 4800 and 5600 kelvin, i.e., light of high quality and temperature necessary for the present invention.

This inventive light fixture 70 disperses light in, a wide angle. Each bulb is equivalent to 100 watts. It insures that all the light reaches the subject. When using a reflector umbrella, one shoots the light into the umbrella and the umbrella reflects the light right back to the subject. However when doing so, one decreases the amount of light reaching the subject, thereby reducing the total number of foot candles reflecting off the subject right back to the camera. By placing the bulbs 76 on the light fixture 74 within the bowl housing 72, one keeps all of that illumination front facing, and prevents all of the light from spilling off to the sides. All of the light generated by the LED light bulbs 76 keeps moving forward to illuminate the subject to be photographed.

In the above-described process, it is important to take the guessing out of and confirm that the light reflected from the subject being photographed and reaching the camera is bright enough. It is also important to examine and determine how all the different colors in the spectrum will expose. To this end one can use the inventive chromatic exposure meter 60, shown in FIGS. 4-10.

The chromatic exposure meter 60 was created to take the guessing out of what the camera sees once all the lighting is set up on the subject to be photographed. It confirms that, the light reflected from the subject being photographed and reaching the camera is bright enough, and all the different colors in the spectrum would expose. It comprises a spectroscope having multiple glass-prisms to spread out the spectrum for a more detailed view than is available on single prism or diffraction grating spectroscopes. It further comprises a nanometer scale and a control that can open and close the iris/slit to change the amount of light that enters the scope. In addition, it comprises a scale 62 adjacent to the control that corresponds to the amount of footcandles that fall on a given subject, once the lighting is set up.

The scale 62 ranges from 0 footcandles to 200 footcandles. The scale was designed and calibrated by setting up a white card at a distance of 3 meters from the lights and camera (an average distance from subject on a set) and using an incident light meter (amount of light measured at subject) to measure the proper amount of footcandles to shine on the white card for each number on the scale. The scope was aimed at the white card, from a distance of 3 meters. The process of developing the scale was started with the iris of the spectroscope fully closed (no light getting through) and opened until the spectrum could be seen, of light shining on and reflecting off the white card comfortably without straining, for each footcandle setting on the scale.

The process of sing the exposure meter 60 involves keeping in mind the following. A normal "good" exposure for a person's face on a regular camera is about 5 to 10 footcandles with a camera f-stop set to f2.8. A normal "good" exposure for a person's face in the inventive system requires at least 100 footcandles with a camera f-stop set to f2.8. Further, the process of use of the exposure meter 60 comprises the following steps: a) using a light meter to measure the number of footcandles illuminating the subject's face and making sure that it is over 100 foot candles; b) opening the iris of the spectroscope using its corresponding control to the point that the marked scale 62 corresponds to the number of foot candles measured; c) pointing the exposure meter 60 at the subject from the location and distance of the camera; and d) using the ocular piece of the exposure meter 60 examining to see if the light is bright enough for the inventive system and how all of the different colors in the spectrum will expose with the inventive means and process.

The inventive chromatic exposure meter 60, is further provided with a "cheat sheet" listing the wavelengths of the primary colors 66 in nanometers. The closer a hue falls to each listed wavelength, when seen through the exposure meter 60, the brighter and more saturated that hue will expose in the inventive system.

The settings on the scale of said exposure meter 60, could be lowered to 50 or 25 foot candles to inspect how colors will look in shadow areas, or could be increased to 150 or 200 footcandles to see how highlights will render out in the finished film. Hues often shift as light levels change. The inventive system is very sensitive to even minor changes in hue so being able to know in advance what the hues actually look like when light levels change is very important.

In another embodiment, the chromatic exposure meter is provided with:
a) an eyecup;
b) an ISO Wheel having a scale for 12, 25, 50, 100, 200, 400, 800, 1600, 3200, and 6400. ISO is the measure of the sensitivity of the image sensor of a camera;
c) a Shutter Speed Wheel equipped with a Shutter Speed scale of 1/800, 1/400, 1/200, 1/100, 1/50, 1/25, 1/12, 1/6, 1/3, and 1/1.6 of a second. The shutter speed is the length of time that the interior sensor of the camera is exposed to light. When a camera's shutter is open it exposes the interior sensor in order to take a photograph;
d) an F-Stop Wheel equipped with an f-stop scale is 1.4, 2, 2.8, 4, 5.6, 8, 11, 16, 22, and 32. The f-stop number is a ratio of the system's focal length to the diameter of the entrance pupil;

e) a Foot Candle Wheel correlating to the Iris-Foot Candle Measure, and equipped with a scale of 3, 6, 12, 25, 50, 100, 200, 400, 800, 1600, 3200, and 6400-foot candles; and f) a Rainbow Calibrator having a series of marks which are used in the implementation of the inventive Process herein. The first mark, denoted with a fanciful Ying-Yang Symbol is the center of the scale for calibration. The C and A bound the area in which the colors will appear the most vibrant. The O stands for overexposed. The U stands for underexposed.

The process of using the inventive chromatic exposure meter 60, comprises:

1. Opening the iris all the way;
2. Holding the eye cup up to the left eye and looking into the chromatic exposure meter;
3. Adjusting the level of the iris until a rainbow can be seen by closing the iris slowly;
4. Ensuring that the rainbow and the scale can be seen within the eye cup. The scale displays the wavelengths of light within the rainbow;
5. Closing the iris all the way;
6. opening the right eye, so that both eyes are open;
7. Slowly reopening the iris until the rainbow appears superimposed over the field of vision, and adjusting the opening of the iris such that the level of brightness of the rainbow matches the brightness of the subject at the center of the right eye;
8. Going back and forth, opening and closing until the rainbow brightness is as close as possible. If the rainbow is starting to draw attention to itself, it's too bright. If it's transparent or semitransparent, it's too dark. If the rainbow is too bright, use the Bright Light Attachment. Screw it onto the front of the spectroscope to dim the light entering the iris and get a more accurate reading at a higher brightness. The present invention reduces the light by 4 stops.
9. Extending the barrel of the chromatic exposure meter such that the wheels can spin freely, and matching the ying-yang marker on the rainbow wheel to the number on the brightness wheel.
10. Turning the Shutter Speed Wheel such that the red strip matches the sensitivity of the camera that will be used to shoot the scene.
11. Consulting the wheels to calculate the combinations of shutter speed and F-Stop to correctly expose the scene. Each combination provides the same exposure.
12. Using the Rainbow Calibrator to visualize where the colors are going to fall on the spectrum. The colors should sit between A and C on the rainbow to be vibrant in the scene.
13. Aligning the ying-yang mark with the foot candle reading from the iris. If necessary, rearrange lighting to bring the object into range so that it falls in this area with full, vibrant color. If an object is outside of the range and underexposed, it will not be visible because it will be too dark. If an object is outside of the range and overexposed, it will not be visible because it will be too light, as it is bleached out white. The Rainbow Calibrator provides the range of wavelengths which will be visible in the lighting of the scene such that the user can visualize where in the exposure objects are going to fall by their foot candle readings.

In order to obtain a white balance reading, place the White Balance Cartridge into the barrel of the spectroscope in front of the iris. The green light filter removes the green light and allows for a measurement of the red versus the blue light in the scene. The iris must be wide open and then slowly closed until all of the red or blue disappears. The Bright Light Adapter may be necessary again. Whichever color disappears first, the foot candle marking marks the 5000K temperature. Continue to close the iris and when the other color (red or blue) disappears, the difference between this foot candle marking and the previous is used to find the temperature of the light. Every marker over is −500 degrees.

The exposure meter 60 is further provided with a mount of bracket 64 that can hold a small "on camera" LED light 68. This light matches the color temperature, quality and light output of the larger lights used during the inventive process. When mounted on said exposure meter 60, it can be used in conjunction with the exposure meter 60 to inspect the color spectrum of costumes, props, skintones, etc. before anything ever arrives on set. This way one can know before ever arriving on set how the costumes and props, etc. . . . will look and choose items that have the proper hues for the effect aimed for in each scene.

While particular embodiments of the invention have been illustrated and described in detail herein, they are provided by way of illustration only and should not be construed to limit the invention. Since certain changes may be made without departing from the scope of the present invention, it is intended that all matter contained in the above description, or shown in the accompanying drawings be interpreted as illustrative and not in a literal sense. Practitioners of the art will realize that the sequence of steps and the embodiments depicted in the figures can be altered without departing from the scope of the present invention and that the illustrations contained herein are singular examples of a multitude of possible depictions of the present invention.

Accordingly, I claim:

1. An apparatus for the production of photographic and cinemato-graphic works comprising:
    (a) a camera;
    (b) a lens mounted on said camera;
    (c) a step-up lens-filter adapter ring secured on said lens mounted on said camera;
    (d) a TIFFEN® GLIMMERGLASS® diffusion filter mounted on said step-up, lens-filter adapter ring; and
    an optical band-stop filter mounted on said TIFFEN® GLIMMERGLASS® diffusion filter, said optical band stop filter preventing the transmission of light having a 565-615 nm wavelength and allowing the transmission of no more than 20% of light, having wavelengths other than 565-615 nm,
    such that the produced photographic and cinematographic works exhibit a purer, wider color gamut of glowing red, green, and blue colors.

2. The apparatus, according to claim 1, wherein said TIFFEN® GLIMMERGLASS® diffusion filter is selected from the group of TIFFEN® GLIMMERGLASS® diffusion filters, each having a strength of 1, 2, 3, 4, and 5, respectively.

3. The apparatus, according to claim 2, wherein said diffusion filter is a TIFFEN® GLIMMERGLASS® diffusion filter with a strength of 3.

4. The apparatus, according to claim 1, wherein said diffusion filter is a TIFFEN® GLIMMERGLASS® diffusion filter with a strength of 5.

5. The apparatus, according to claim 1, wherein said diffusion filter is a TIFFEN® GLIMMERGLASS® diffusion filter with a strength of 5.

6. The apparatus, according to claim 1, wherein said diffusion filter is a TIFFEN® GLIMMERGLASS® diffusion filter with a strength of 3.

7. An assembly for use with a camera for the production of photographic and cinematographic works exhibiting a purer, wider color gamut of glowing red, green, and blue colors comprising:
- (a) lens capable of being mounted on the camera;
- (b) a step-up lens-filter adapter ring secured on said lens mounted on the camera;
- (c) a TIFFEN® GLIMMERGLASS® diffusion filter mounted on said step-up, lens-filter adapter ring; and
- (d) an optical band stop filter mounted on said TIFFEN® GLIMMERGLASS® diffusion filter, said optical band stop filter preventing the transmission of light having a wavelength of 565-615 nm, and allowing the transmission of no more than 20% of light having wavelengths other than 565-615 nm.

8. The assembly, according to claim 7, wherein said TIFFEN® GLIMMERGLASS® diffusion filter is selected from the group of TIFFEN® GLIMMERGLASS® diffusion filters, each having a strength of 1, 2, 3, 4, and 5, respectively.

9. The assembly, according to claim 8, wherein said TIFFEN® GLIMMERGLASS® diffusion filter is a TIFFEN® GLIMMERGLASS® diffusion filter with a strength of 3.

10. The assembly, according to claim 7, wherein said TIFFEN® GLIMMERGLASS® diffusion filter is a TIFFEN® GLIMMERGLASS® diffusion filter with a strength of 3.

11. A filter assembly for use with a camera to produce photographic and cinematographic works exhibiting a purer, wider color gamut of glowing red, green and blue colors comprising:
- (a) a TIFFEN® GLIMMERGLASS® diffusion filter and
- (b) an optical band-stop filter mounted on said TIFFEN® GLIMMERGLASS® diffusion filter, said optical band stop filter preventing the transmission of light having a of 565-615 nm wavelength, and allowing the transmission of no more than 20% of light having wavelengths other than 565-615 nm.

12. The filter assembly, according to claim 11, wherein said TIFFEN® GLIMMERGLASS® diffusion filter is selected from the group of TIFFEN® GLIMMERGLASS® diffusion filters, each having a strength of 1, 2, 3, 4 and 5, respectively.

13. The assembly, according to claim 12, wherein said TIFFEN® GLIMMERGLASS® diffusion filter is a TIFFEN® GLIMMERGLASS® diffusion filter with a strength of 3.

14. The assembly, according to claim 11, wherein said TIFFEN® GLIMMERGLASS® diffusion filter is a TIFFEN® GLIMMERGLASS® diffusion filter with a strength of 3.

15. An apparatus for the production of photographic and cinematographic works comprising:
- (a) a camera;
- (b) a lens mounted on said camera;
- (c) a step-up lens-filter adapter ring secured on said lens, mounted on said camera;
- (d) a TIFFEN® GLIMMERGLASS® diffusion filter mounted on said step-up, lens-filter adapter ring and
- (e) an optical band-stop filter mounted on said TIFFEN® GLIMMERGLASS® diffusion filter, said optical band-stop filter preventing the transmission of light having a wavelength of 565-615 nm, and allowing the transmission of at least 20% of light having wavelengths other than 565-615 nm, such that the produced photographic and cinematographic works exhibit a purer, wider color gamut of glowing red, green, and blue colors.

16. The apparatus, according to claim 15, wherein said TIFFEN® GLIMMERGLASS® diffusion filter is selected from the group of TIFFEN® GLIMMERGLASS® diffusion filters, each having a strength of 1, 2, 3, 4, and 5, respectively.

17. The apparatus, according to claim 16, wherein said TIFFEN® GLIMMERGLASS® diffusion filter is a TIFFEN® GLIMMERGLASS® diffusion filter with a strength of 3.

18. The apparatus, according to claim 15, wherein said TIFFEN® GLIMMERGLASS® diffusion filter is a TIFFEN® GLIMMERGLASS® diffusion filter with a strength of 3.

19. An assembly for use with a camera for the production of photographic and cinematographic works exhibiting a purer, wider color gamut of glowing red, green, and blue colors comprising:
- (a) a lens capable of being mounted on the camera;
- (b) a step-up lens-filter adapter ring secured on said lens, mounted on the camera;
- (c) a TIFFEN® GLIMMERGLASS® diffusion filter mounted on said step-up lens-filter ring; and
- (d) an optical band-stop filter mounted on said TIFFEN® GLIMMERGLASS® diffusion filter, said optical band-stop filter preventing the transmission of light having a wavelength of 565-615 nm; while simultaneously allowing the transmission of at least 20% of light having wavelengths other than 565-615 nm.

20. The assembly, according to claim 19, wherein said TIFFEN® GLIMMERGLASS® diffusion filter mounted on said step-up lens-filter adapter ring is selected from the group of TIFFEN® GLIMMERGLASS® diffusion filters, each having a strength of 1, 2, 3, 4, and 5, respectively.

21. The assembly, according to claim 20, wherein said TIFFEN® GLIMMERGLASS® diffusion filter mounted on said step-up, lens-filter adapter ring is a TIFFEN® GLIMMERGLASS® diffusion filter with a strength of 3.

22. The assembly, according to claim 17, wherein said TIFFEN® GLIMMERGLASS® diffusion filter mounted on said step-up lens-filter adapter ring is a TIFFEN® GLIMMERGLASS® diffusion filter with a strength of 3.

23. A filter assembly for use with a camera to produce photographic and cinematographic works exhibiting a purer, wider color gamut of glowing red, green and blue colors comprising:
- (a) a TIFFEN® GLIMMERGLASS® diffusion filter; and
- (b) an optical band-stop filter mounted on said TIFFEN® GLIMMERGLASS® diffusion filter, said optical band-stop filter preventing the transmission of light having a wavelength of 565-615 nm while simultaneously allowing the transmission of at least 20% of light, having wavelengths other than 565-615 nm.

24. The filter assembly, according to claim 23, wherein said TIFFEN® GLIMMERGLASS® diffusion filter selected from the group of TIFFEN® GLIMMERGLASS® diffusion filters, each having the strength of 1, 2, 3, 4, and 5, respectively.

25. The filter assembly, according to claim 24, wherein said TIFFEN® GLIMMERGLASS® diffusion filter is a TIFFEN® GLIMMERGLASS® diffusion filter with a strength of 3.

26. The filter assembly, according to claim 23, wherein said TIFFEN® GLIMMERGLASS® diffusion filter is a TIFFEN® GLIMMERGLASS® diffusion filter with a strength of 3.

27. An optical band-stop filter for use with a lens camera assembly for the production of photographic and cinematographic works exhibiting a purer, wider color gamut of glowing red, green, and blue colors, said optical band-stop filter preventing the transmission of light having a wavelength of 565-615 nm while simultaneously allowing the transmission of at least 20% of light having wavelengths other than 565-615 nm.

28. An optical band-stop filter for use with a lens camera assembly for the production of photographic and cinematographic works exhibiting a purer, wider color gamut of glowing red, green, and blue colors, said optical band-stop filter preventing the transmission of light having a 565-615 nm wavelength while simultaneously allowing the transmission of no more than 20% of light having wavelengths other than 565-615 nm.

\* \* \* \* \*